(12) United States Patent
Seo et al.

(10) Patent No.: US 11,782,232 B2
(45) Date of Patent: Oct. 10, 2023

(54) CAMERA MODULE

(71) Applicant: LG INNOTEK CO., LTD., Seoul (KR)

(72) Inventors: Eun Sung Seo, Seoul (KR); Se Kyu Lee, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 244 days.

(21) Appl. No.: 16/763,735

(22) PCT Filed: Nov. 19, 2018

(86) PCT No.: PCT/KR2018/014216
§ 371 (c)(1),
(2) Date: May 13, 2020

(87) PCT Pub. No.: WO2019/098793
PCT Pub. Date: May 23, 2019

(65) Prior Publication Data
US 2021/0263259 A1 Aug. 26, 2021

(30) Foreign Application Priority Data

Nov. 17, 2017 (KR) .................. 10-2017-0153850
Jan. 17, 2018 (KR) .................. 10-2018-0005893

(51) Int. Cl.
*G02B 7/04* (2021.01)
*G02B 3/14* (2006.01)
(Continued)

(52) U.S. Cl.
CPC ............ *G02B 7/04* (2013.01); *G02B 3/14* (2013.01); *G02B 7/021* (2013.01); *G03B 13/34* (2013.01); *H04N 23/951* (2023.01)

(58) Field of Classification Search
CPC . G02B 7/021; G02B 3/14; G02B 7/04; G02B 5/04–06; G02B 5/02–0294;
(Continued)

(56) References Cited

U.S. PATENT DOCUMENTS 9,288,395 B2   3/2016 Baer et al.
2005/0019000 A1 1/2005 Lim et al.
(Continued)

FOREIGN PATENT DOCUMENTS

CN   103389609 A   11/2013
CN   104034258 A    9/2014
(Continued)

OTHER PUBLICATIONS

International Search Report (PCT/ISA/210) issued in PCT/KR2018/014216, dated Feb. 28, 2019.
(Continued)

*Primary Examiner* — Xi Wang
(74) *Attorney, Agent, or Firm* — Birch, Stewart, Kolasch & Birch, LLP

(57) ABSTRACT

A camera module according to an embodiment includes an image sensor configured to output a plurality of image frames; a lens assembly disposed on the image sensor, the lens assembly forming an optical path of light incident on the image sensor from outside; a controller configured to generate a control signal to adjust at least one of the optical path of the lens assembly or the position of the image sensor relative to the lens assembly; and an image synthesizer configured to synthesize the plurality of image frames to generate a composite image, wherein the composite image has a higher resolution than the plurality of image frames, and wherein the plurality of image frames are respective image frames generated along respectively different optical paths changed by the lens assembly or respective image
(Continued)

frames generated by change in the position of the image sensor relative to the lens assembly.

17 Claims, 15 Drawing Sheets

(51) Int. Cl.
*G02B 7/02* (2021.01)
*H04N 23/951* (2023.01)
*G03B 13/34* (2021.01)

(58) Field of Classification Search
CPC .......... G02B 27/10–16; H04N 5/23232; G03B 13/34; G06T 3/4053–4076; H05K 2201/10121
USPC ................................. 359/618–640, 831–837
See application file for complete search history.

(56) References Cited

U.S. PATENT DOCUMENTS

| | | | |
|---|---|---|---|
| 2009/0010638 A1* | 1/2009 | Chao | G02B 7/02 396/529 |
| 2009/0268316 A1* | 10/2009 | Huang | G03B 3/10 359/823 |
| 2011/0075013 A1* | 3/2011 | Chang | G02B 7/022 348/335 |
| 2012/0307357 A1 | 12/2012 | Choi et al. | |
| 2014/0125825 A1 | 5/2014 | Baer et al. | |
| 2015/0085179 A1* | 3/2015 | Van Heugten | G02B 7/38 348/349 |
| 2015/0199792 A1 | 7/2015 | Pavani | |
| 2016/0212332 A1 | 7/2016 | Tang et al. | |
| 2016/0212349 A1* | 7/2016 | Imada | H04N 5/23258 |
| 2017/0223250 A1* | 8/2017 | Ajito | H04N 23/843 |
| 2017/0285306 A9* | 10/2017 | Oishi | G02B 13/0055 |
| 2019/0141248 A1* | 5/2019 | Hubert | H02K 41/0356 |
| 2020/0049863 A1* | 2/2020 | Lee | G02B 7/021 |

FOREIGN PATENT DOCUMENTS

| | | |
|---|---|---|
| CN | 104394309 A | 3/2015 |
| EP | 0 669 757 A2 | 8/1995 |
| FR | 3 041 458 A1 | 3/2017 |
| KR | 10-2005-0002979 A | 1/2005 |
| KR | 10-2012-0134223 A | 12/2012 |
| KR | 10-2014-0146566 A | 12/2014 |
| KR | 10-2016-0104324 A | 9/2016 |
| WO | WO 2017/149092 A2 | 9/2017 |

OTHER PUBLICATIONS

Ben-Ezra et al., "Jitter Camera: High Resolution Video from a Low Resolution Detector," Proceedings of the 2004 IEEE Computer Society Conference on Computer Vision and Pattern Recognition (CVPR'04), Washington, D.C., Jun. 27-Jul. 2, 2004, 8 pages total.

Borman et al. "Spatial Resolution Enhancement of Low-Resolution Image Sequences: A Comprehensive Review with Directions for Future Research," Internet Citation, Jul. 8, 1998 (Jul. 8, 1998), XP002299310, Retrieved from the Internet: URL:http://www.seanborman.com/publications/SRreview.pdf [retrieved on Jul. 8, 1998].

* cited by examiner

[FIG. 1]
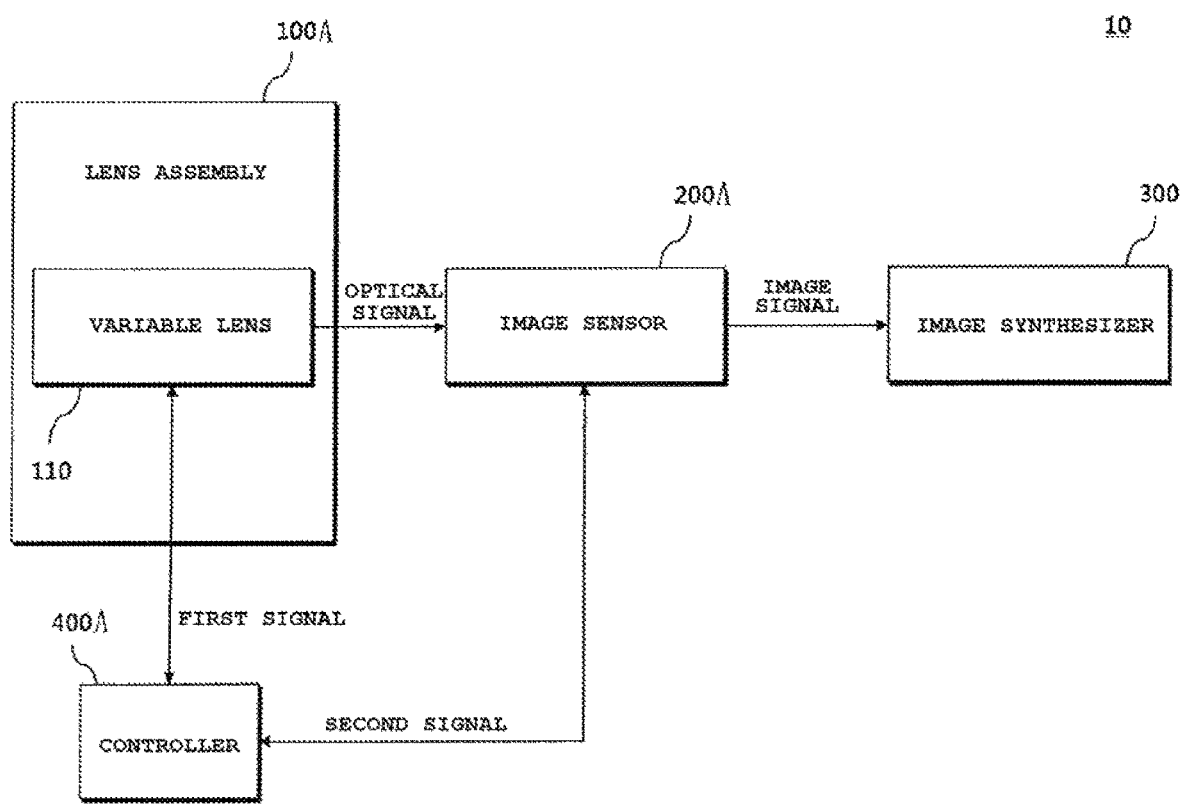

[FIG. 2a]
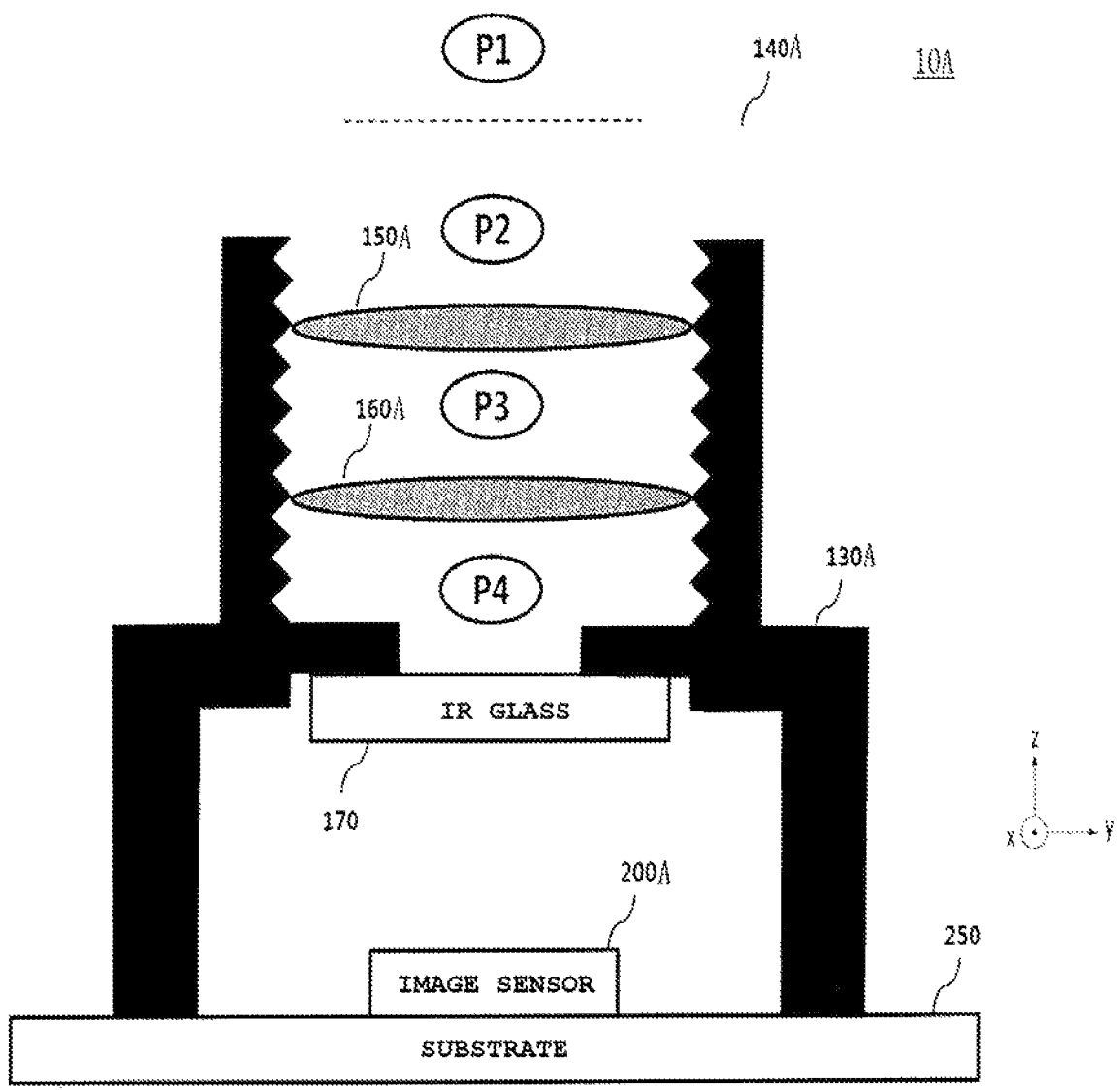

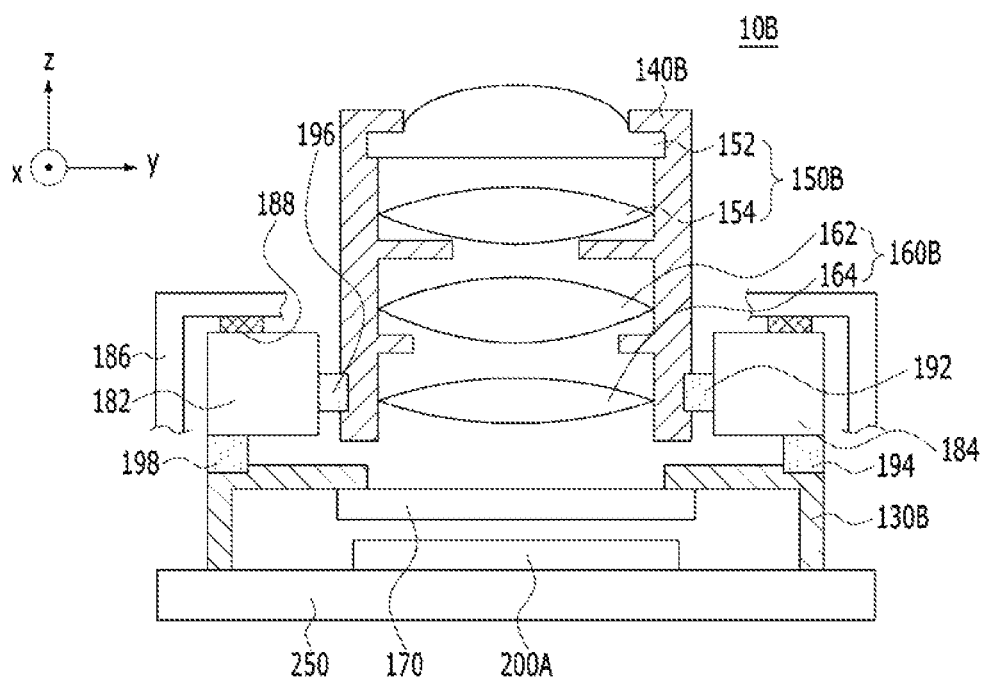
[FIG. 2b]

[FIG. 3]
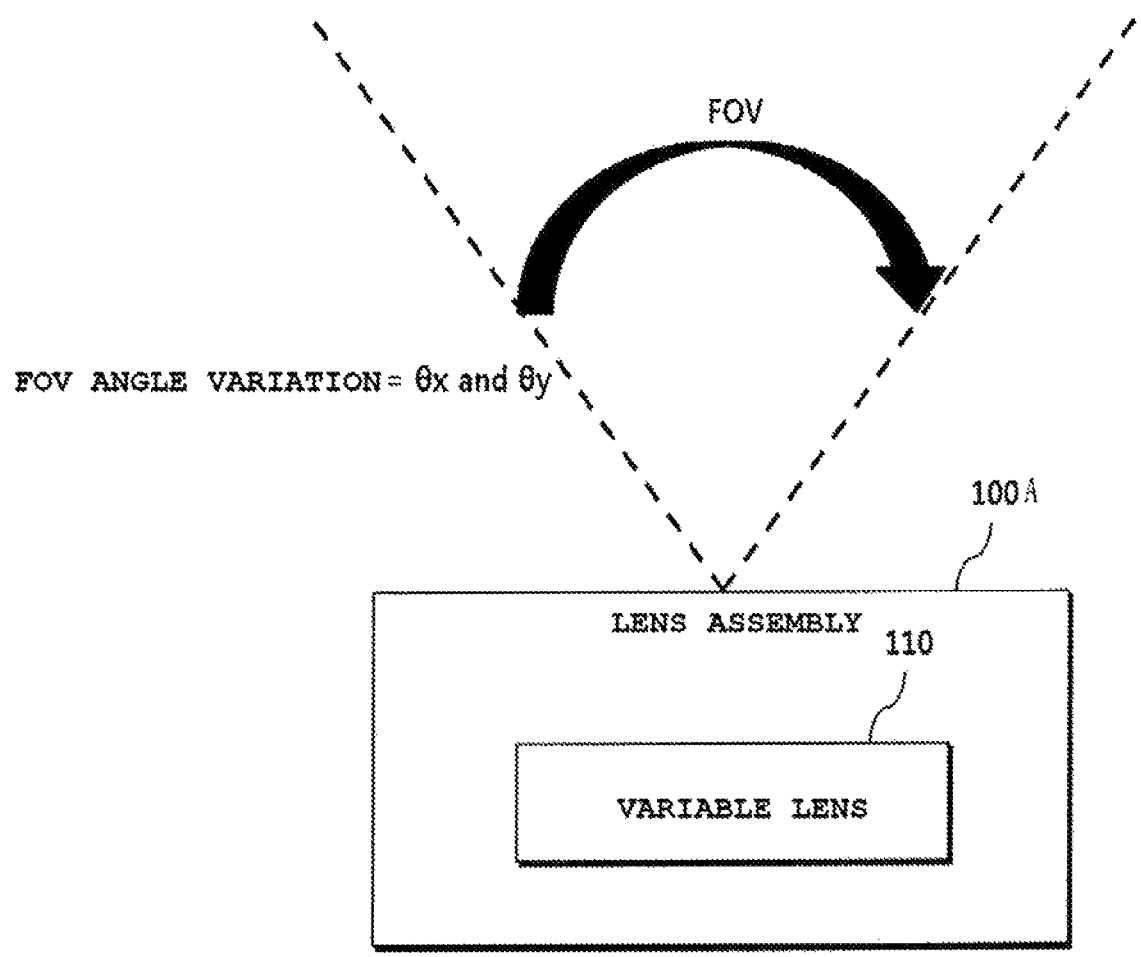

[FIG. 4]
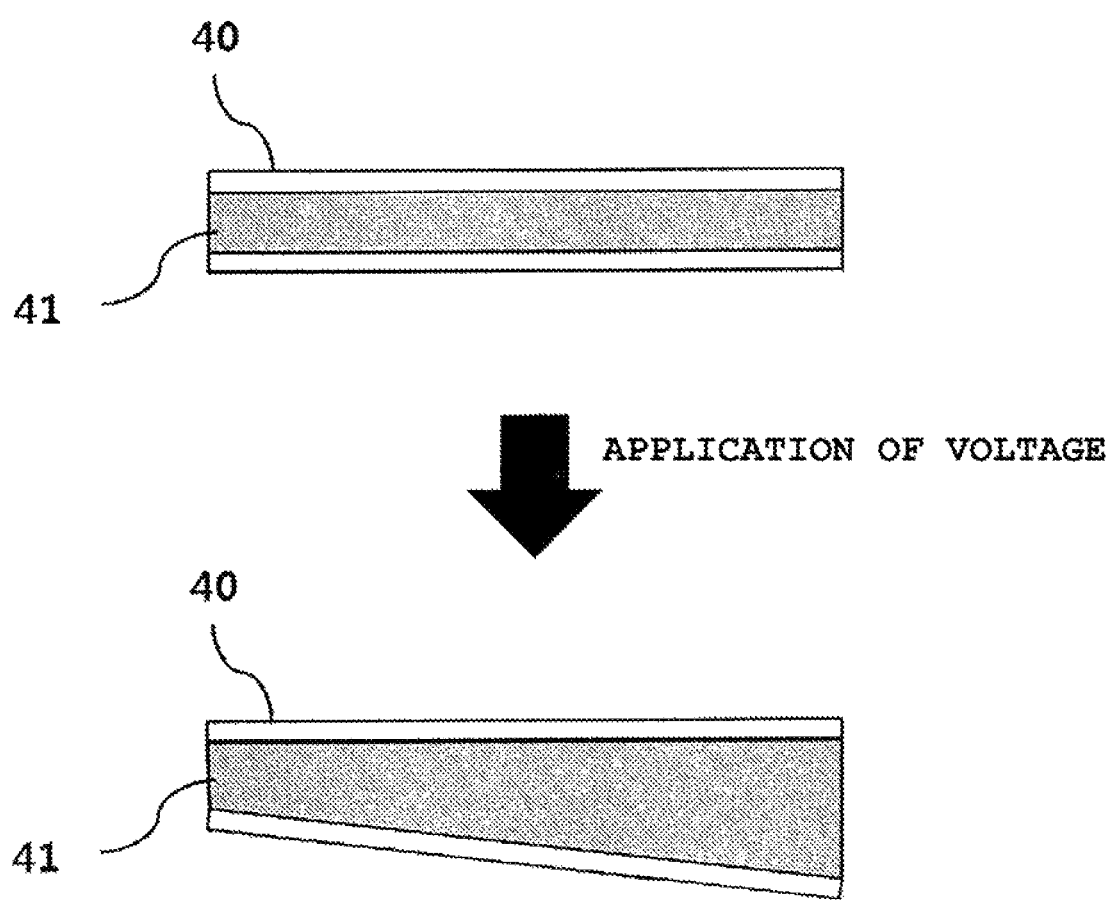

[FIG. 5]
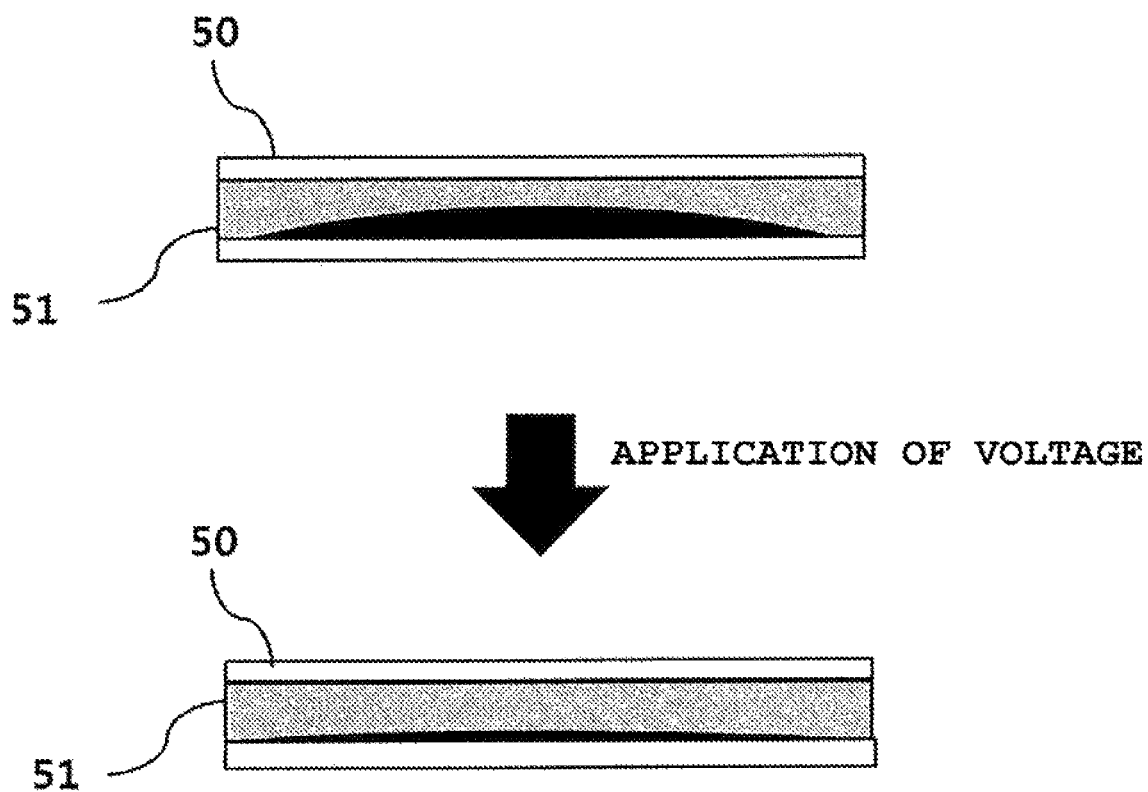
[FIG. 6]
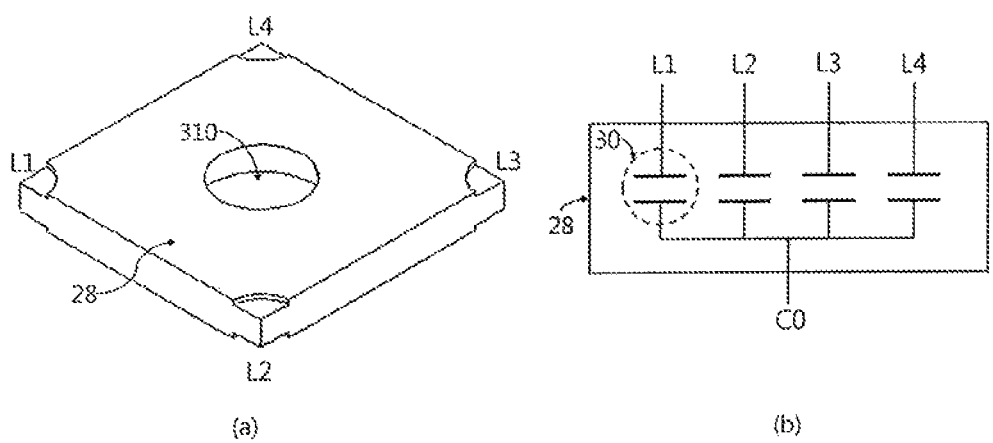

[FIG. 7]
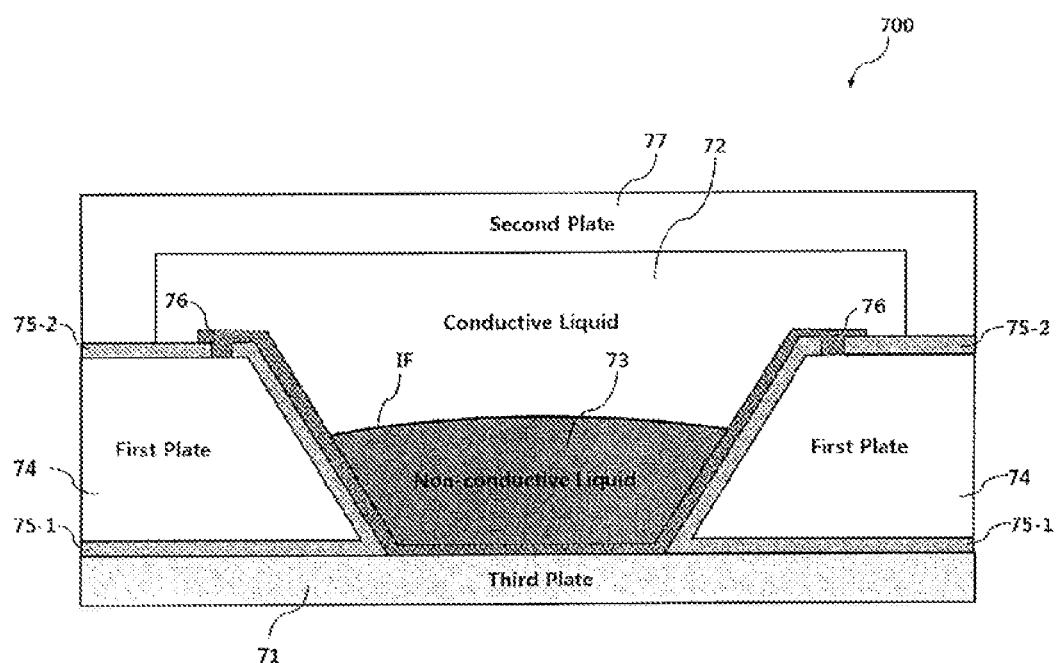

[FIG. 8]
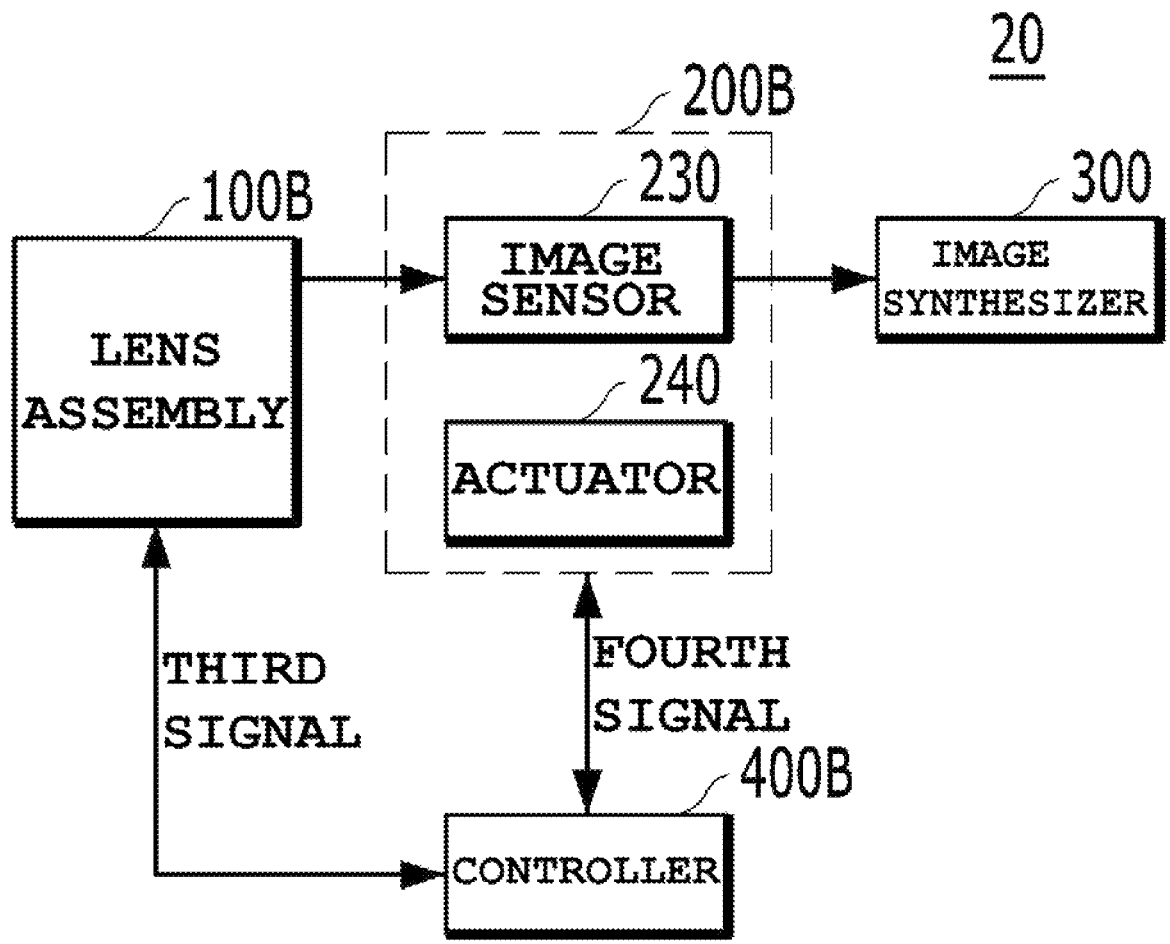
[FIG. 9]
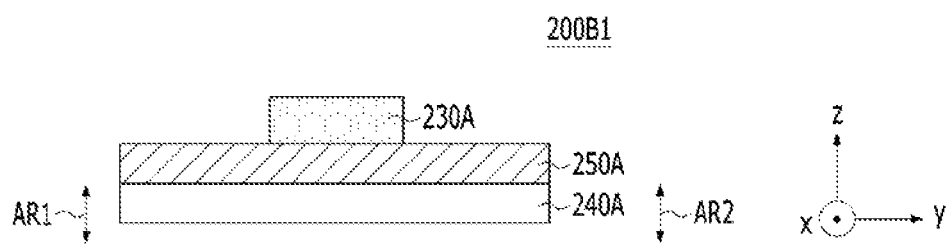

[FIG. 10]
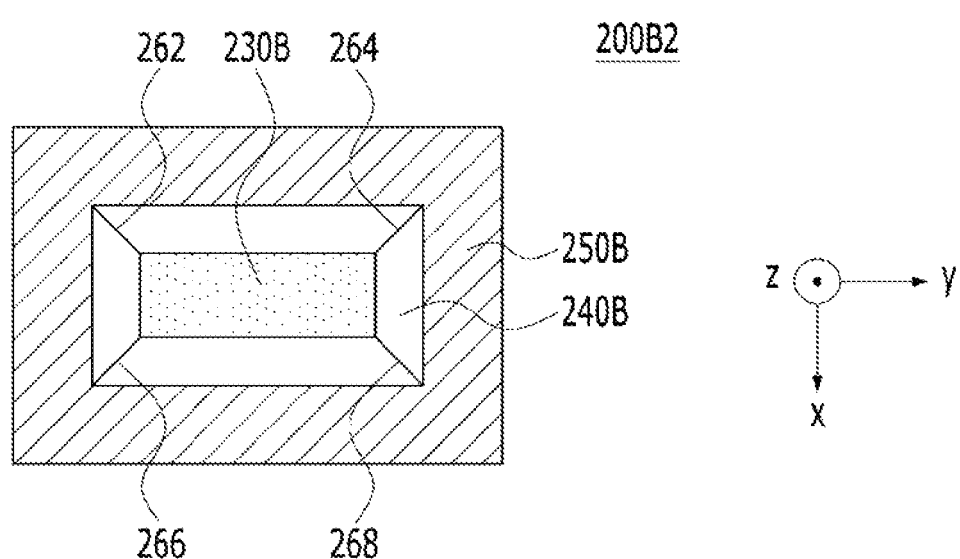

[FIG. 11]
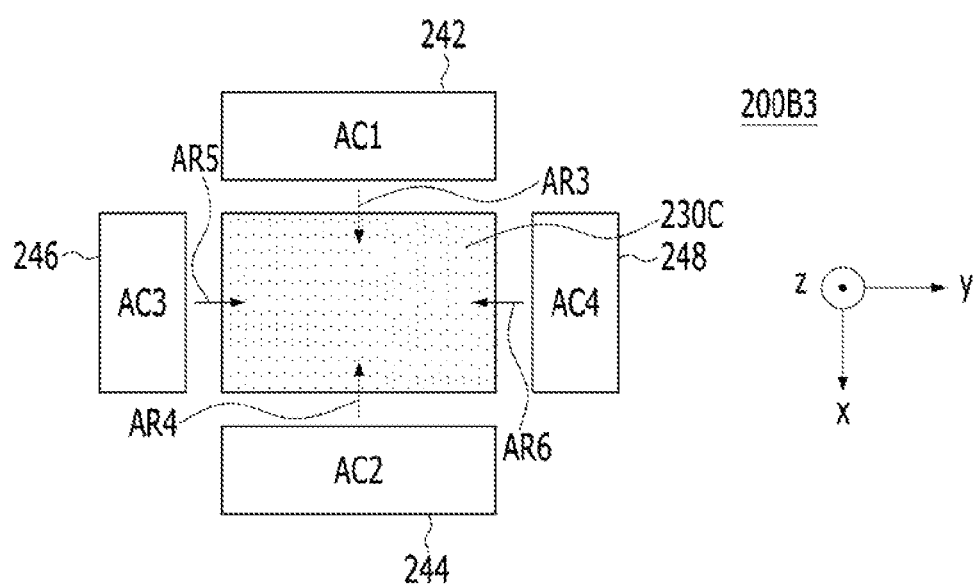

【FIG. 12a】
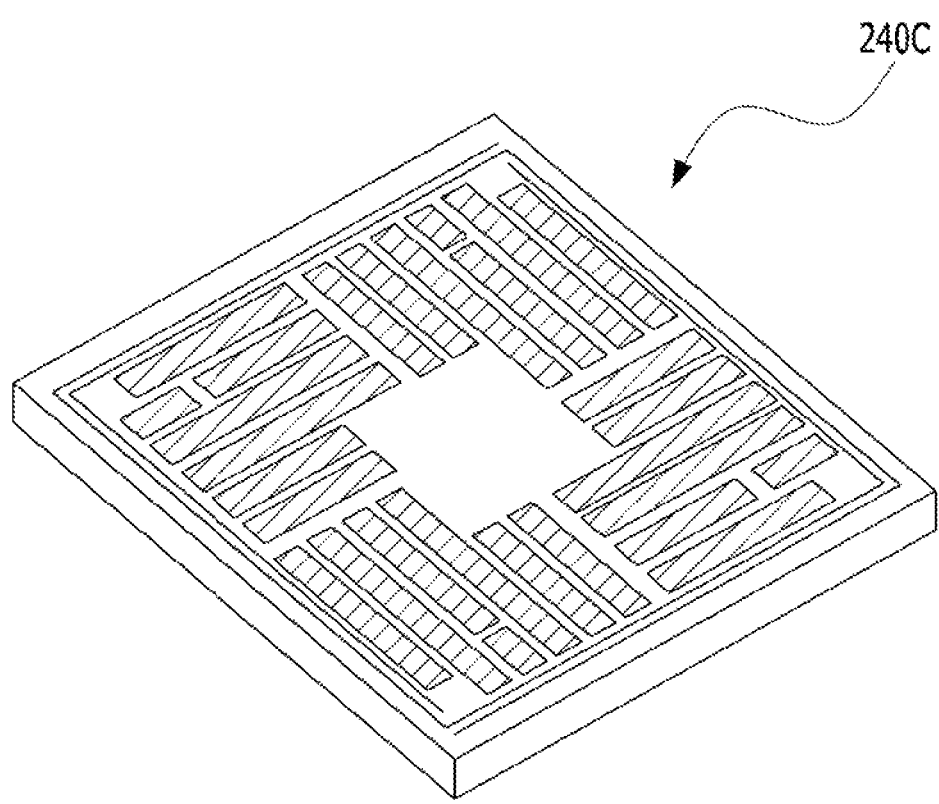

【FIG. 12b】
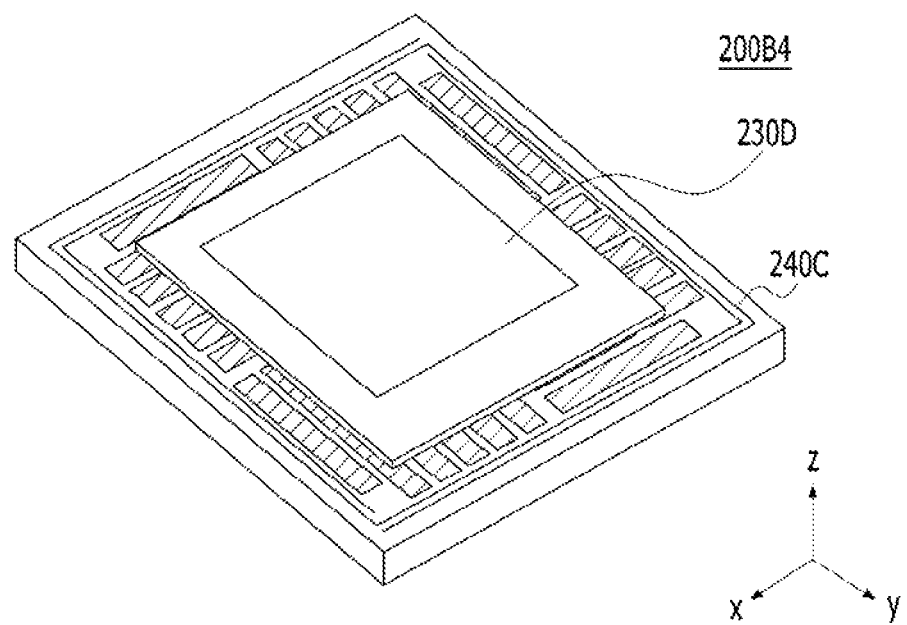

[FIG. 13]
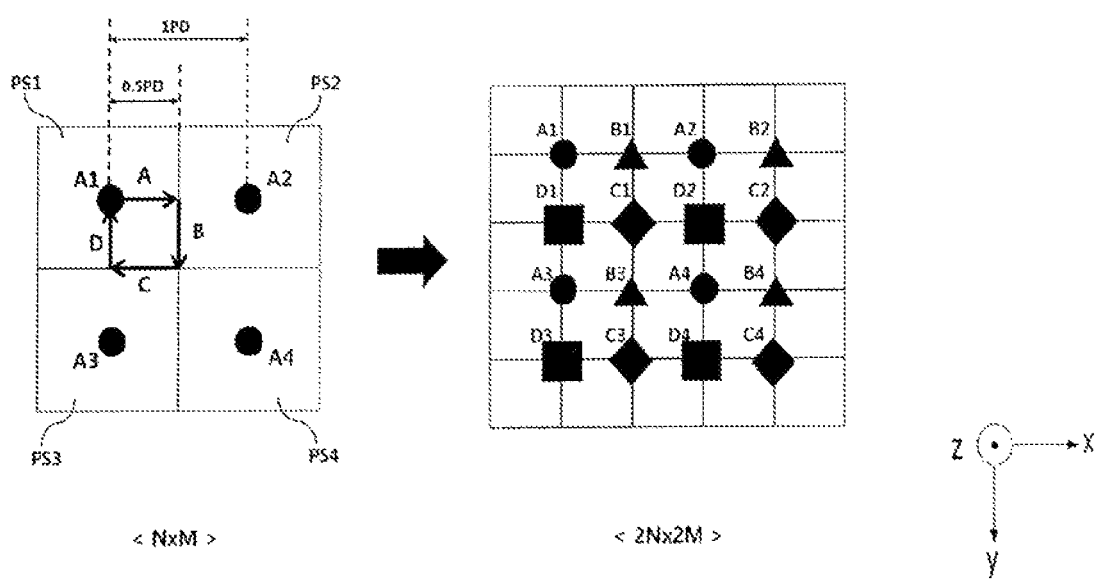

[FIG. 14]
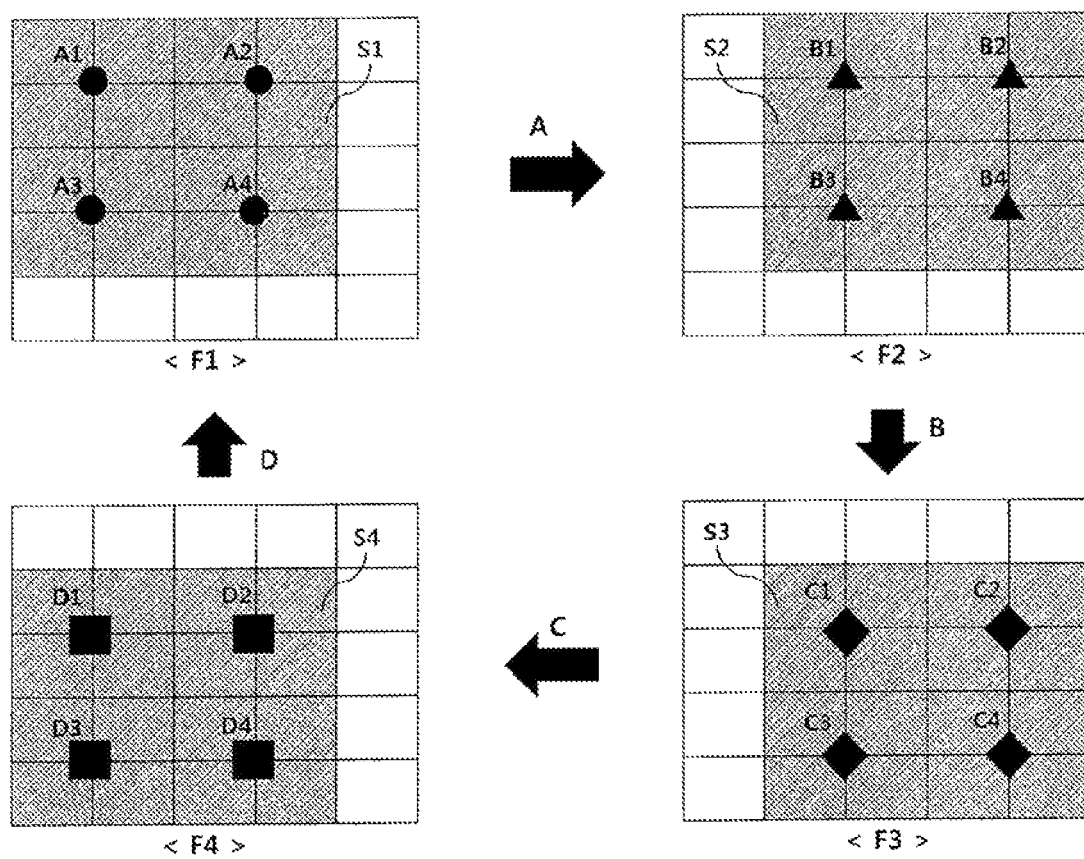

[FIG. 15]
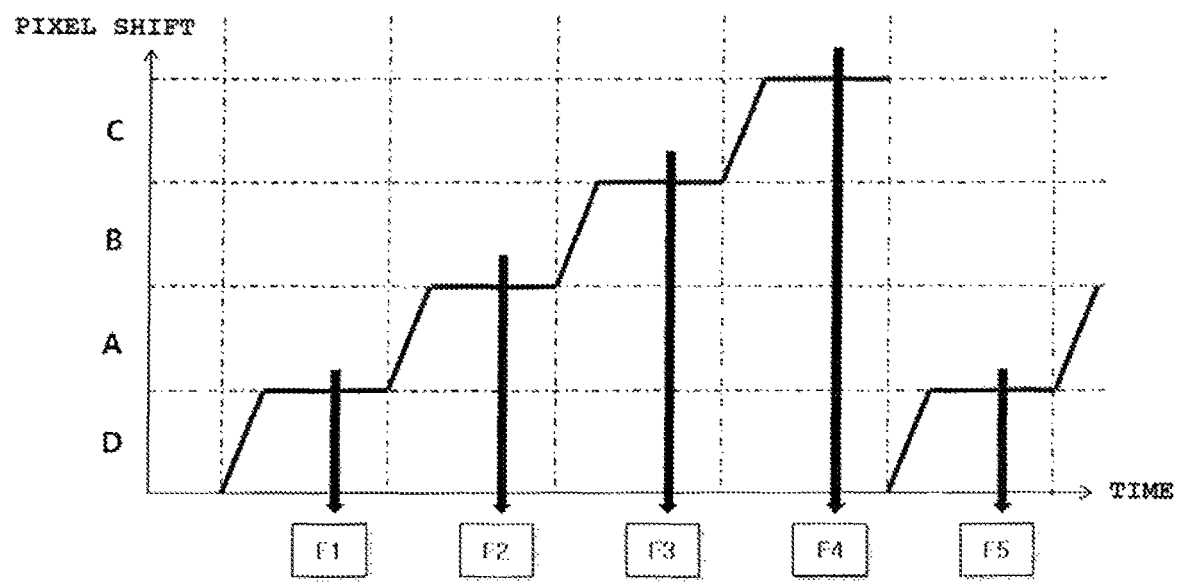
[FIG. 16]
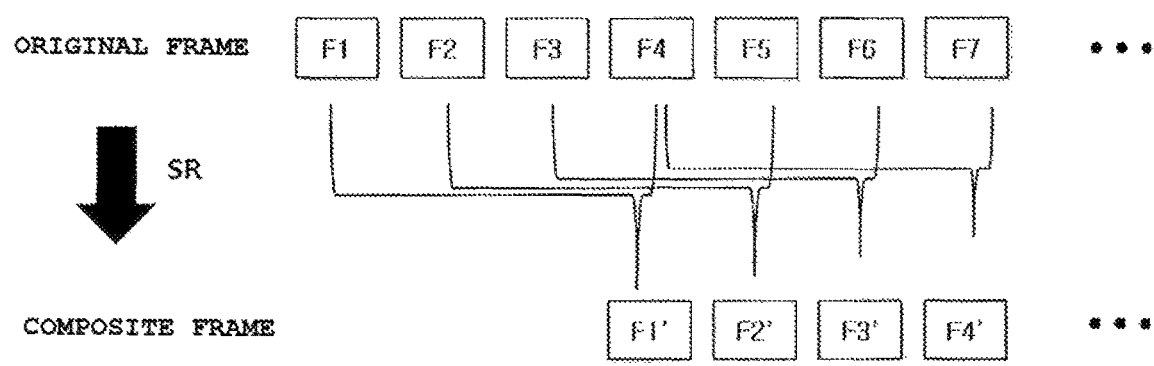

CAMERA MODULE

CROSS REFERENCE TO RELATED APPLICATIONS

This application is the National Phase of PCT International Application No. PCT/KR2018/014216, filed on Nov. 19, 2018, which claims priority under 35 U.S.C. 119(a) to Patent Application No. 10-2017-0153850, filed in the Republic of Korea on Nov. 17, 2017 and Patent Application No. 10-2018-0005893, filed in the Republic of Korea on Jan. 17, 2018, all of which are hereby expressly incorporated by reference into the present application.

TECHNICAL FIELD

The present disclosure relates to a camera module. More particularly, the present disclosure relates to a camera module and an optical device capable of generating a super-resolution image.

BACKGROUND ART

People who use portable devices demand optical devices that have high resolution, are small, and have various photographing functions (an optical zoom-in/zoom-out function, an auto-focusing (AF) function, a hand-tremor compensation or optical image stabilizer (OIS) function, etc.). Such photographing functions may be realized by directly moving a plurality of lenses that are combined. In the case in which the number of lenses is increased, however, the size of an optical device may increase.

The auto-focusing and hand-tremor compensation functions are performed by moving or tilting a plurality of lens modules, which are fixed to a lens holder in the state in which the optical axes thereof are aligned, along the optical axis or in the direction perpendicular to the optical axis, and a separate lens driving apparatus is used to drive the lens modules. However, the lens driving apparatus has high power consumption, and an additional cover glass needs to be provided separately from the camera module in order to protect the lens driving apparatus, thus leading to an increase in the overall thickness of a device.

Further, with increasing user demand for a high-quality image, an image sensor capable of capturing a high-resolution image is required. To this end, however, the number of pixels included in an image sensor is inevitably increased, which may result in an increase in the size of the image sensor and increased power consumption.

That is, since a conventional camera module uses a plurality of arrays of data as they are, it has limitations in that a resolution thereof is determined by the physical resolution of an image sensor. In addition, there are limitations in that a plurality of cameras needs to be used in order to generate a super-resolution image.

DISCLOSURE

Technical Problem

The present disclosure provides a camera module capable of generating a super-resolution image without increasing the number of pixels.

However, the objects to be accomplished by the disclosure are not limited to the above-mentioned objects, and other objects not mentioned herein will be clearly understood by those skilled in the art from the following description.

Technical Solution

A camera module according to an embodiment may include an image sensing unit including an image sensor configured to output a plurality of image frames, a lens assembly disposed on the image sensor and forming an optical path of light incident on the image sensor from the outside, a controller configured to generate a control signal to adjust at least one of the optical path of the lens assembly or the position of the image sensor relative to the lens assembly, and an image synthesizer configured to synthesize the plurality of image frames to generate a composite image. The composite image may have a higher resolution than the plurality of image frames, and the plurality of image frames may be respective image frames generated along respectively different optical paths changed by the lens assembly or respective image frames generated by change in the position of the image sensor relative to the lens assembly.

A camera module according to another embodiment may include an image sensor configured to output a plurality of image frames, a lens assembly disposed on the image sensor and including a variable lens configured to adjust an optical path of light incident on the image sensor from the outside, a controller configured to generate a control signal to control the variable lens, and an image synthesizer configured to synthesize the plurality of image frames to generate a composite image. The composite image may have a higher resolution than the plurality of image frames, and the plurality of image frames may be respective image frames generated along respectively different optical paths changed by the variable lens.

For example, the plurality of image frames may include a first image frame and a second image frame, and the second image frame may be an image frame moved by a first interval based on the first image frame.

For example, the image sensor may generate one image frame among the plurality of image frames, may receive a feedback signal indicating that the optical path has been adjusted by the variable lens, and may generate another image frame among the plurality of image frames.

For example, the controller may receive a signal indicating that one of the plurality of image frames has been completely generated, and may transmit the control signal to the variable lens to adjust the optical path.

For example, the image sensor may include a first region and a second region, and the controller may output a signal to control the variable lens such that the optical path of light, incident from the outside and passing through the variable lens, is changed from the first region to the second region of the image sensor.

For example, the variable lens may include a liquid lens configured such that an interface formed between two liquids having properties different from each other is deformed according to the control signal.

For example, the variable lens may be a variable prism configured such that the angle of a lower plate thereof is changed according to the control signal.

For example, the variable lens may include at least one lens and an actuator configured to move or tilt the at least one lens in at least one of the vertical direction or the horizontal direction according to the control signal.

For example, the image sensor may include a first region and a second region, and the controller may output a signal to control the variable lens such that the optical path of light, incident from the outside and passing through the variable lens, is changed from the first region to the second region of the image sensor.

For example, the image sensor may further include a third region and a fourth region, and the controller may output a signal to control the variable lens such that the optical path is changed from the second region to the third region, and may output a signal to control the variable lens such that the optical path is changed from the third region to the fourth region.

For example, the control signal may include a signal for changing the field of view (FOV) of the lens assembly in a first direction, a signal for changing the FOV of the lens assembly in a second direction, a signal for changing the FOV of the lens assembly in a third direction, and a signal for changing the FOV of the lens assembly in a fourth direction.

A camera module according to still another embodiment may include an image sensing unit including an image sensor configured to output a plurality of image frames, a lens assembly disposed on the image sensor and forming an optical path of light incident on the image sensor from the outside, a controller configured to generate a control signal to adjust the position of the image sensor relative to the lens assembly, and an image synthesizer configured to synthesize the plurality of image frames to generate a composite image. The composite image may have a higher resolution than the plurality of image frames, and the plurality of image frames may be respective image frames generated by change in the position of the image sensor relative to the lens assembly.

For example, the plurality of image frames may include a first image frame and a second image frame, and the second image frame may be an image frame moved by a first interval based on the first image frame.

For example, the image sensing unit may further include an actuator configured to move or tilt the image sensor in at least one of an optical-axis direction or a direction perpendicular to the optical-axis direction according to the control signal.

For example, the image sensor may include a first region and a second region, and the controller may output a signal to control the actuator such that the region that receives light, which is incident from the outside and passes through the lens assembly, is changed from the first region to the second region of the image sensor.

For example, the image sensor may further include a third region and a fourth region, and the controller may output a signal to control the actuator such that the region that receives light, which is incident from the outside and passes through the lens assembly, is changed from the second region to the third region, and may output a signal to control the actuator such that the region that receives light, which is incident from the outside and passes through the lens assembly, is changed from the third region to the fourth region.

For example, the image synthesizer may generate a first super-resolution image frame by synthesizing first to fourth image frames transmitted from the image sensor, and thereafter may generate a second super-resolution image frame by synthesizing a fifth image frame and the second to fourth image frames output from the image sensor.

A camera module according to still another embodiment may include a lens assembly including a liquid lens configured to adjust an optical path, an image sensor configured to sense a plurality of images using the lens assembly, a controller configured to control the liquid lens, and a synthesizer configured to synthesize the plurality of images to generate a composite image. The plurality of images may include images generated along respectively different optical paths changed by the liquid lens.

A camera module according to still another embodiment may include an image sensor configured to sense a plurality of images, a lens assembly configured to form an optical path of light incident on the image sensor, a controller configured to adjust at least one of the optical path or the position of the image sensor, and an image synthesizer configured to synthesize the plurality of images to generate a composite image. The plurality of images may include images generated along respectively different optical paths by the lens assembly or images generated at respectively different positions of the image sensor.

An optical device according to still another embodiment may include the camera module, a display unit configured to output an image, a battery configured to supply power to the camera module, and a housing in which the camera module, the display unit, and the battery are mounted.

An image generation method according to still another embodiment may include a step of outputting a first image frame, a step of generating a second image frame, which is moved by a first distance in a first direction from the first image frame, a step of generating a third image frame, which is moved by the first distance in a second direction from the second image frame, a step of generating a fourth image frame, which is moved by the first distance in a third direction from the third image frame, and a step of synthesizing the first image frame to the fourth image frame to generate a composite image. The composite image may have a higher resolution than the plurality of image frames.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of the device according to the present disclosure will be described below.

In a camera module according to an embodiment of the present disclosure, high computational complexity required to obtain a super-resolution image may be solved by a hardware-based method using a variable lens for changing an optical path or using an image sensor, the position of which relative to a lens assembly is changed, without increasing the number of pixels and using a plurality of cameras. That is, since a plurality of array data shifted by a half (0.5 PD) of a pixel distance (PD) is used, an image having a super resolution higher than the physical resolution of the image sensor may be obtained.

In addition, composite frames may be successively generated with respect to the current frames that are sequentially input, thereby preventing deterioration in frame rate.

However, the effects achievable through the disclosure are not limited to the above-mentioned effects, and other effects not mentioned herein will be clearly understood by those skilled in the art from the following description.

DESCRIPTION OF DRAWINGS

FIG. 1 is a block diagram illustrating a camera module according to an embodiment.

FIGS. 2a and 2b are views illustrating embodiments of the camera module shown in FIG. 1.

FIG. 3 is a diagram for explaining an embodiment of the operation of changing the FOV angle of a variable lens.

FIG. 4 is a view illustrating an embodiment of the variable lens included in the camera module shown in FIG. 2a.

FIG. 5 is a view illustrating another embodiment of the variable lens included in the camera module shown in FIG. 2a.

FIG. 6 is a view for explaining the variable lens according to the embodiment shown in FIG. 5 in more detail.

FIG. 7 is a view illustrating a liquid lens according to an embodiment.

FIG. 8 is a block diagram illustrating a camera module according to another embodiment.

FIG. 9 is a cross-sectional view of an embodiment of the image sensing unit shown in FIG. 8.

FIG. 10 is a plan view of another embodiment of the image sensing unit shown in FIG. 8.

FIG. 11 is a plan view of still another embodiment of the image sensing unit shown in FIG. 8.

FIGS. 12a and 12b are perspective views of still another embodiment of the image sensing unit shown in FIG. 8.

FIG. 13 is a diagram for explaining an operation method of the camera module according to an embodiment.

FIG. 14 is a diagram for explaining the operation method of the camera module explained in FIG. 13 in more detail.

FIG. 15 is a timing diagram of the operation method of the camera module according to an embodiment.

FIG. 16 is a diagram illustrating an example of a frame synthesis method of the camera module according to an embodiment.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under another element or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

Camera modules 10 and 20 according to embodiments will be described using the Cartesian coordinate system. However, other coordinate systems may be used. In the Cartesian coordinate system, an x-axis, a y-axis, and a z-axis are perpendicular to each other, but the disclosure is not limited thereto. That is, the x-axis, the y-axis, and the z-axis may intersect each other.

Hereinafter, a camera module 10 according to an embodiment will be described with reference to the accompanying drawings.

FIG. 1 is a block diagram illustrating a camera module 10 according to an embodiment.

Referring to FIG. 1, the camera module 10 may include a lens assembly 100A, an image sensor 200A, an image synthesizer 300, and a controller 400A.

The lens assembly 100A may allow light incident thereon from the outside of the camera module 10 to pass therethrough so that an optical signal is transmitted to the image sensor 200A. The lens assembly 100A may include a variable lens 110. In some embodiments, the lens assembly 100A may further include at least one lens in addition to the variable lens 110. The lenses included in the lens assembly 100A may form one optical system and may be aligned along the optical axis of the image sensor 200A.

The variable lens 110 may change the optical path of the lens assembly 100A under the control of the controller 400A. The variable lens 110 may change the optical path of light incident on the image sensor 200A, and may change, for example, the focal length of an optical signal, the angle of a field of view (FOV), or the direction of the FOV.

According to an embodiment, the variable lens 110 may be configured as a liquid lens or a variable prism. Alternatively, the variable lens 110 may not include a liquid lens, but may include only at least one solid lens. In this case, the material of an optical element such as a variable prism may not be fluid and may have a refractive index of 1 to 3. In addition, two or more kinds of materials may be provided inside the variable lens 110, and the interface between the materials may be changed to change optical power.

According to another embodiment, the variable lens 110 may include at least one lens and an actuator engaged with the at least one lens. Here, the at least one lens may be a liquid lens or a solid lens, or may include both a liquid lens and a solid lens. The actuator may control the physical displacement of the at least one lens under the control of the controller 400A. That is, the actuator may adjust the distance between the at least one lens and the image sensor 200A, or may adjust the angle between the at least one lens and the image sensor 200A. Alternatively, the actuator may shift the at least one lens in the x-axis and y-axis directions of the plane formed by the pixel array of the image sensor 200A. In addition, the actuator may change the optical path of light incident on the pixel array of the image sensor 200A. For example, in the case in which a liquid lens is not included in the at least one lens included in the variable lens 110, i.e. in the case in which the at least one lens included in the variable lens 110 is a solid lens, the actuator may move or tilt the at least one lens in at least one of the vertical direction or the horizontal direction in response to a control signal (i.e. a first signal shown in FIG. 1) output from the controller 400A.

The image sensor 200A may include a pixel array configured to receive an optical signal, having passed through the lens assembly 100A, and to convert the optical signal into an electrical signal corresponding thereto, a driving circuit configured to drive a plurality of pixels included in the pixel array, and a readout circuit configured to read an analog pixel signal of each pixel. The readout circuit may compare the analog pixel signal with a reference signal and may generate a digital pixel signal (or an image signal) through analog-to-digital conversion. Here, the digital pixel signal of each of the pixels included in the pixel array constitutes an image signal, and the image signal may be transmitted in a frame unit and may be defined as an image frame. That is, the image sensor may output a plurality of image frames.

The image synthesizer 300 may be an image processor that receives an image signal from the image sensor 200A and processes the image signal (e.g. interpolation, frame synthesis, etc.). In particular, the image synthesizer 300 may generate an image signal of one frame (high resolution) by synthesizing image signals of a plurality of frames (low resolution). The plurality of image frames may be respective image frames generated along respectively different optical paths changed by the variable lens 110. The image synthesizer 300 may be referred to as a postprocessor. The plurality of image frames may include a first image frame and a second image frame, and the second image frame may be an image frame moved by a first interval based on the first image frame.

The controller 400A may control the variable lens 110 and the image sensor 200A such that the image sensor 200A generates an image signal in synchronization with the control state of the variable lens 110. To this end, the controller 400A may transmit and receive a first signal to and from the variable lens 110 and may transmit and receive a second signal to and from the image sensor 200A.

The first signal may be generated by the controller 400A, and may include a lens control signal for controlling the optical path of the variable lens 110 or may include a lens control signal for controlling the focal length or the FOV angle of the variable lens 110. In particular, the lens control signal may determine the optical path of light passing through the variable lens 110. In addition, the lens control signal may determine the direction and angle to which the FOV angle of the variable lens 110 is changed. In some embodiments, the first signal may be generated by the variable lens 110, and may include a response signal indicating that the variable lens 110 has been completely controlled according to the lens control signal. The controller 400A may be referred to as a variable lens driver.

The second signal may be generated by the image sensor 200A, and may include a synchronization signal instructing transmission of the lens control signal to the variable lens 110. In some embodiments, the second signal may be generated by the image sensor 200A, and may include control information, based on which a control signal for controlling the optical path of the variable lens 110 is generated. In some embodiments, the second signal may be generated by the controller 400A, and may include a feedback signal indicating reception of a response signal indicating that the variable lens 110 has been completely controlled according to the lens control signal.

In addition, the second signal may include a driving signal for driving the image sensor 200A.

Here, the signals included in the first signal and the second signal are merely exemplary, and, as needed, may be omitted, or other signals may be added thereto.

FIG. 2a is a view illustrating an embodiment 10A of the camera module 10 shown in FIG. 1.

Referring to FIG. 2a, the camera module 10A may include a lens assembly, an image sensor 200A, and a substrate 250. Here, the lens assembly may include a holder 130A, a lens barrel 140A, a first lens unit 150A, a second lens unit 160A, and an IR glass 170 configured to allow infrared (IR) light to pass therethrough or to block IR light. At least one of these components may be omitted, or the vertical arrangement of these components may be changed. In addition, the lens assembly may further include a variable lens 110 configured to change the optical path under the control of the controller 400A.

The holder 130A may be coupled to the lens barrel 140A to support the lens barrel 140A, and may be coupled to the substrate 250 to which the image sensor 200A is attached. In addition, the holder 130A may have a space in which the IR glass 170 is attached to the bottom of the lens barrel 140A. The holder 130A may have a spiral structure, and may be rotatably engaged with the lens barrel 140A having a spiral structure as well. However, this is merely exemplary, and the holder 130A and the lens barrel 140A may be coupled to each other using an adhesive (e.g. an adhesive resin such as epoxy), or the holder 130A and the lens barrel 140A may be integrally formed with each other.

The lens barrel 140A may be coupled to the holder 130A, and may include a space formed therein to accommodate the first lens unit 150A, the second lens unit 160A, and the variable lens 110. The lens barrel 140A may be rotatably engaged with the first lens unit 150A, the second lens unit 160A, and the variable lens 110, but this is merely exemplary. These components may be engaged in any of other manners, for example, using an adhesive.

The first lens unit 150A may be disposed in front of the second lens unit 160A. The first lens unit 150A may include at least one lens, or two or more lenses may be aligned along the central axis thereof to form an optical system. Here, the central axis may be the same as the optical axis of the optical system of the camera module 10 (10A). The first lens unit 150A may be constituted by one lens, as shown in FIG. 2a, but the disclosure is not necessarily limited thereto.

The second lens unit 160A may be disposed behind the first lens unit 150A. Light incident on the first lens unit 150A from the outside of the camera module 10 (10A) may pass through the first lens unit 150A and may be incident on the second lens unit 160A. The second lens unit 160A may include at least one lens, or two or more lenses may be aligned along the central axis thereof to form an optical system. Here, the central axis may be the same as the optical axis of the optical system of the camera module 10 (10A). The second lens unit 160A may be constituted by one lens, as shown in FIG. 2a, but the disclosure is not necessarily limited thereto.

The first lens unit 150A and the second lens unit 160A may be referred to as a 'first solid lens unit' and a 'second solid lens unit', respectively, in order to be distinguished from a liquid lens.

As described above, the lens assembly may further include a variable lens 110, and the position of the variable lens 110 may be any one of first to fourth positions P1 to P4. However, this is merely exemplary, and the variable lens 110 may be located elsewhere depending on the presence or absence of the first lens unit 150A, the second lens unit 160A, and the IR glass 170 or depending on the relative positions thereof. However, the variable lens 110 may be located on the optical path, which is a region through which light incident on the lens assembly passes, and may change the focal length or the FOV angle.

The first position P1 is a position corresponding to the outside of the lens barrel 140A, and the second position P2 is a position corresponding to a region above the first lens unit 150A within the lens barrel 140A. The third position P3 is a position corresponding to a region between the first lens unit 150A and the second lens unit 160A within the lens barrel 140A, and the fourth position P4 is a position corresponding to a region below the second lens unit 160A within the lens barrel 140A.

The IR glass 170 may filter light of a specific wavelength range among light beams that have passed through the second lens unit 160A. The IR glass 170 may be mounted and fixed in a recess formed in the holder 130A.

The image sensor 200A may be mounted on the substrate 250 and may perform a function of converting light having passed through the lens assembly into an image signal.

The substrate 250 may be disposed under the holder 130A and may include wires for transmitting an electrical signal between the respective components together with the image synthesizer 300 and the controller 400A. In addition, a connector (not shown) for realizing electrical connection with a power source or other devices (e.g. an application processor) present outside the camera module 10 may be connected to the substrate 250.

The substrate 250 may be configured as a rigid flexible printed circuit board (RFPCB) and may be bent depending on the requirements of the space in which the camera module 10 (10A) is mounted, but the disclosure is not limited thereto.

FIG. 2b is a view illustrating another embodiment 10B of the camera module 10 shown in FIG. 1.

Among the components of the camera module 10B shown in FIG. 2b, the same parts as those of the camera module 10A shown in FIG. 2a are denoted by the same reference numerals, and a duplicate description thereof will be omitted. Only parts different from those of the camera module 10A will be described below. Thus, the description of the camera module 10A shown in FIG. 2a may be applied to the respective components shown in FIG. 2b.

The camera module 10B may include a lens assembly, an image sensor 200A, and a substrate 250. At least one of these components may be omitted, or the vertical arrangement of these components may be changed. Since the image sensor 200A and the substrate 250 shown in FIG. 2b correspond to the image sensor 200A and the substrate 250 shown in FIG. 2b, respectively, a description thereof will be omitted. In addition, the camera module 10B may further include a cover 186. The cover 186 may be disposed so as to surround the components of the camera module 10B while exposing an opening in the upper portion of the lens assembly, and may protect the respective components of the camera module 10B.

The lens assembly may include a variable lens 110, a holder 130B, a lens barrel 140B, a first lens unit 150B, a second lens unit 160B, and an IR glass 170. At least one of these components may be omitted, or the vertical arrangement of these components may be changed.

The variable lens 110, the holder 130B, the lens barrel 140B, the first lens unit 150B, the second lens unit 160B, and the IR glass 170 shown in FIG. 2b, respectively, perform the same functions as the variable lens 110, the holder 130A, the lens barrel 140A, the first lens unit 150A, the second lens unit 160A, and the IR glass 170 shown in FIG. 2a. However, except for the IR glass 170, the variable lens 110, the holder 130B, the lens barrel 140B, the first lens unit 150B, and the second lens unit 160B shown in FIG. 2b may have different configurations from the variable lens 110, the holder 130A, the lens barrel 140A, the first lens unit 150A, and the second lens unit 160A shown in FIG. 2a, which will be described below.

While the lens barrel 140A shown in FIG. 2a is configured to be inserted into the holder 130A, the lens barrel 140B shown in FIG. 2b may be spaced apart from the upper portion of the holder 130B.

The holder 130B may be coupled to the lens barrel 140B via connection parts 192 to 198 and actuators 182 and 184 and may support the lens barrel 140B. In addition, like the holder 130A shown in FIG. 2a, the holder 130B shown in FIG. 2b may include a space in which the IR glass 170 is attached thereto below the lens barrel 140B.

The lens barrel 140B may include a space formed therein to accommodate lenses that may be included in the first lens unit 150B, the second lens unit 160B, and the variable lens 110. The lens barrel 140B may be rotatably engaged with the lenses of the first lens unit 150B, the second lens unit 160B, and the variable lens 110, but this is merely exemplary. These components may be engaged in any of other manners, for example, using an adhesive.

In addition, while the first lens unit 150A shown in FIG. 2a includes only one lens, the first lens unit 150B shown in FIG. 2b includes two lenses. Similarly, while the second lens unit 160A shown in FIG. 2a includes only one lens, the second lens unit 160B shown in FIG. 2b includes two lenses. However, the disclosure is not limited thereto. The number of lenses included in each of the first and second lens units 150B and 160B may be one, as shown in FIG. 2a, or may be three or more.

The variable lens 110 shown in FIG. 2b may include actuators 182 and 184, an adhesive part 188, and connection parts 192, 194, 196 and 198. In addition, the variable lens 110 may include at least one lens, and the at least one lens may include only a liquid lens, may include only a solid lens, or may include both a liquid lens and a solid lens.

The number of actuators 182 and 184 included in the variable lens 110 is illustrated as being two in FIG. 2b. However, according to another embodiment, the number of actuators 182 and 184 may be one. That is, the actuators 182 and 184 shown in FIG. 2b may be implemented as a unitary part. In addition, the number of actuators 182 and 184 may be three or more. As such, the disclosure is not limited as to the specific number of actuators 182 and 184.

The actuators 182 and 184 may move or tilt the at least one lens included in the lens assembly in at least one of the vertical direction or the horizontal direction in response to a control signal output from the controller 400A, i.e. the first signal. To this end, the actuators 182 and 184 may be disposed around the outer wall of the lens barrel 140B.

The actuators 182 and 184 may control the physical displacement of the lenses 150B and 160B under the control of the controller 400A. That is, the actuators 182 and 184 may adjust the distance between the at least one lens 150B and 160B and the image sensor 200A, or may adjust the angle between the at least one lens 150B and 160B and the image sensor 200A. Alternatively, the actuators 182 and 184 may shift the at least one lens in the x-axis and y-axis directions of the plane formed by the pixel array of the image sensor 200A. In addition, the actuators 182 and 184 may change the optical path of light incident on the pixel array of the image sensor 200A. For example, in the case in which a liquid lens is not included in the at least one lens included in the variable lens 110, i.e. in the case in which the at least one lens included in the variable lens 110 is a solid lens, the actuators 182 and 184 may move the at least one lens that may be included in the first and second lens units 150B and 160B and the variable lens 110, in at least one of the vertical direction or the horizontal direction in response to a control signal (i.e. the first signal shown in FIG. 1) output from the controller 400A.

As described above, if the actuators 182 and 184 are capable of moving the at least one lens included in the lens assembly in the vertical direction, moving the same in the horizontal direction, or tilting the same, the optical path may be changed by the actuators 182 and 184. The actuators 182 and 184 may precisely move the lens, and may be driven in response to a driving signal output from the controller 400A in the form of voltage or current. Here, the driving signal may be included in the first signal.

For example, the lens barrel 140B may be moved by a distance of 1 mm or less by the actuators 182 and 184. The lens barrel 140B may be moved or tilted along the optical axis or in the direction perpendicular to the optical axis, and the tilting angle may be 1° or less.

In addition, in order to perform the above-described operation, the actuators 182 and 184 may be piezoelectric elements, voice coil motors (VCMs), or microelectromechanical systems (MEMSs), but the disclosure is not limited as to the specific form of the actuators 182 and 184.

In order for the actuators 182 and 184 to move the at least one lens included in the lens assembly in the horizontal direction, the actuators 182 and 184 may be disposed beside the lens barrel 140B and may move the entirety of the lens barrel 140B in the horizontal direction (e.g. at least one of the x-axis direction or the y-axis direction). To this end, the connection parts 192 and 196 may be interposed between the actuators 182 and 184 and the lens barrel 140B. The connection parts 192 and 196 serve to connect the actuators 182 and 184 to the lens barrel 140B. In some cases, when the actuators 182 and 184 are directly connected to the lens barrel 140B, the connection parts 192 and 196 may be omitted.

In addition, in order for the actuators 182 and 184 to move the at least one lens included in the lens assembly in the vertical direction, the actuators 182 and 184 may be disposed above the holder 130B and may move the entirety of the lens barrel 140B in the vertical direction (e.g. the z-axis direction). To this end, the connection parts 194 and 198 may be interposed between the actuators 182 and 184 and the holder 130B. The connection parts 194 and 198 serve to connect the actuators 182 and 184 to the holder 130B. In some cases, when the actuators 182 and 184 are directly connected to the holder 130B, the connection parts 194 and 198 may be omitted.

The actuator may be implemented in the form of a voice coil motor (VCM). In this case, a coil disposed around the lens barrel may be included, and the coil may interact with a magnet, which is disposed in a housing or a yoke while being spaced apart from the barrel and the coil, thereby adjusting the position of the lens barrel. In this case, an elastic member or the like may be disposed such that one end thereof supports the barrel and the opposite end thereof is coupled to the housing or the yoke.

In addition, the variable lens 110 may further include an adhesive part 188. The adhesive part 188 serves to couple the cover 186 to the actuators 182 and 184. While the cover 186 is not movable, the actuators 182 and 184 may move or tilt in at least one of the horizontal direction or the vertical direction. To this end, the adhesive part 188 may be made of a material that enables movement of the actuators 182 and 184, or, in some cases, the adhesive part 188 may be omitted. If the adhesive part 188 is omitted, the cover 186 and the actuators 182 and 184 may be spaced apart from each other.

FIG. 3 is a diagram for explaining an embodiment of the operation of changing the FOV angle of the variable lens as the change in the optical path by the variable lens.

Referring to FIG. 3, the lens assembly 100A may have a specific field of view (FOV). The FOV may refer to a range of incident light which the image sensor 200A is capable of capturing through the lens assembly 100A, and may be defined as an FOV angle. The FOV angle of a typical lens assembly may range from 60 degrees to 140 degrees. On the basis of the x-axis and the y-axis defined when the lens assembly 100A is viewed from above (i.e. from the direction perpendicular to the optical axis), the FOV angle will include a first FOV angle Fx and a second FOV angle Fy. The first FOV angle Fx refers to the angle of the FOV that is determined along the x-axis, and the second FOV angle Fy refers to the angle of the FOV that is determined along the y-axis.

A plurality of pixels included in the pixel array of the image sensor 200A may be arranged in the form of an N×M matrix (where each of N and M is an integer of 1 or more). That is, N pixels may be disposed along the x-axis, and M pixels may be disposed along the y-axis. An optical signal incident through the FOV corresponding to the first FOV angle Fx and the second FOV angle Fy is incident on the N×M pixel array.

The optical path of light passing through the lens assembly 100A or the FOV of the lens assembly 100A may be changed by a lens control signal included in the first signal. The lens control signal may individually change the first FOV angle Fx and the second FOV angle Fy. The changes in the first FOV angle Fx and the second FOV angle Fy according to the lens control signal are determined by a first angle variation θx and a second angle variation θy.

The first angle variation θx and the second angle variation θy may be defined by the following Equation 1 and Equation 2, respectively.

$$\frac{Fx}{N} \times a < \theta x < \frac{Fx}{N} \times b \qquad \text{[Equation 1]}$$

$$\frac{Fy}{M} \times a < \theta y < \frac{Fy}{M} \times b \qquad \text{[Equation 2]}$$

Here, 'a' may have a value greater than 0.1 and less than 0.5, and 'b' may have a value greater than 1 and less than 2. However, the scope of the embodiment is not limited thereto.

In this case, θx and θy are angle variations with respect to an image generated by the image sensor 200A, and the actual angle variations of the variable lens 110 may be greater or less than the above angle variations. In the case in which the variable lens 110 is a transmission type, the value of each of θx and θy is generally less than 2, and in the case in which the variable lens 110 is a reflection type, the value of each of θx and θy is generally greater than 1. However, the above value may greatly vary depending on the configuration of the optical system of the lens assembly 100A.

FIG. 4 is a view illustrating an embodiment of the variable lens included in the camera module 10A shown in FIG. 2*a*.

Referring to FIG. 4, a variable lens 40 is an exemplary embodiment of the variable lens 110 shown in FIG. 1. The variable lens 40 may have a structure including a fluid 41 between plates arranged in the vertical direction. The fluid 41 may be formed of a fluid material having a refractive index of 1 to 2. When driving voltage is applied to the fluid 41, the fluid 41 may be concentrated in a specific direction so that an angle of the lower plate with respect to the image sensor is changed. In addition, as the driving voltage applied to the fluid 41 increases (or as the deviation of the driving voltage increases), the angle of the lower plate with respect to the image sensor 200A may increase. Using these characteristics, the driving voltage applied to the variable lens 40 may be determined in advance so that the first FOV angle Fx and the second FOV angle Fy are changed according to the lens control signal.

The variable lens 40 may be a variable prism, but the scope of the present disclosure is not limited thereto.

FIG. 5 is a view illustrating another embodiment 50 of the variable lens 110 included in the camera module 10A shown in FIG. 2a.

Referring to FIG. 5, a variable lens 50 is another exemplary embodiment of the variable lens 110 shown in FIG. 1. The variable lens 50 may have a structure including two liquids 51 having respectively different properties between plates arranged in the vertical direction. The two liquids 51 may be formed of fluid materials having a refractive index of 1 to 2. When driving voltage is applied to the two liquids 51, the interface formed between the two liquids 51 is deformed so that the FOV angle of the interface is changed. In addition, as the driving voltage applied to the two liquids 51 increases (or as the deviation of the driving voltage increases), the change in the FOV angle of the interface may increase. Using these characteristics, the driving voltage applied to the variable lens 50 may be determined in advance so that the first FOV angle Fx and the second FOV angle Fy are changed according to the lens control signal.

FIG. 6 is a view for explaining the variable lens according to the embodiment shown in FIG. 5 in more detail.

Specifically, FIG. 6(a) illustrates a liquid lens 28, and FIG. 6(b) illustrates an equivalent circuit of the liquid lens 28. Here, the liquid lens 28 may correspond to the variable lens 50 of FIG. 5.

First, referring to FIG. 6(a), the liquid lens 28, the interface of which is adjusted according to driving voltages, may receive driving voltages through a plurality of electrode sectors L1, L2, L3 and L4, which are disposed at the same angular distances from each other in four different directions to constitute a first electrode, and an electrode sector constituting a second electrode. When the driving voltages are applied through the plurality of electrode sectors L1, L2, L3 and L4 constituting the first electrode and the electrode sector constituting the second electrode, the interface between a conductive liquid and a non-conductive liquid disposed in a lens region 310 may be deformed. The degree and type of deformation of the interface between the conductive liquid and the non-conductive liquid may be controlled by the control circuit (the controller 400A of FIG. 1).

Further, referring to FIG. 6(b), the liquid lens 28 may be defined as a plurality of capacitors 30, one side of each of which receives voltage from a corresponding one of the respectively different electrode sectors L1, L2, L3 and L4, and the other side of which is connected to the electrode sector C0 of the second electrode and receives voltage therefrom.

Although the embodiment including four individual electrodes is described by way of example, the scope of the present disclosure is not limited thereto.

FIG. 7 is a view illustrating a liquid lens 700 according to an embodiment.

Referring to FIG. 7, the cross-section of the liquid lens 700 may correspond to an embodiment of the cross-section of the liquid lens 28 shown in FIG. 6.

The liquid lens 700 may include a conductive liquid 72, a non-conductive liquid 73, a plate, an electrode unit, and an insulating layer 76. The plate may include a first plate 74, and may further include a second plate 77 and a third plate 71. The electrode unit may include a first electrode 75-1 and a second electrode 75-2.

The second plate 77 and the third plate 71 may be formed of a transparent material. Any one of the second plate 77 and the third plate 71 may be disposed in the liquid lens 700 so as to preferentially receive light passing through the lens assembly 100A. The third plate 71 may be disposed under the first electrode 75-1, and the second plate 77 may be disposed on the second electrode 75-2.

The conductive liquid 72 and the non-conductive liquid 73 may be charged in a cavity defined by an open region of the first plate 74. That is, the cavity may be filled with the conductive liquid 72 and the non-conductive liquid 73 that have properties different from each other, and an interface IF may be formed between the conductive liquid 72 and the non-conductive liquid 73 that have properties different from each other.

As the interface IF formed between the conductive liquid 72 and the non-conductive liquid 73 changes in flexure and inclination, the focal length or the shape of the liquid lens 700 may be adjusted. The region in which an optical signal may pass through the interface IF may correspond to the lens region 310 described with reference to FIG. 6.

Here, the conductive liquid 72 may include at least one of ethylene glycol or sodium bromide (NaBr), or may be formed of a mixture of ethylene glycol and sodium bromide (NaBr). The non-conductive liquid 73 may include phenyl-based silicon oil.

The first plate 74 may be located between the third plate 71 and the second plate 77, and may include an open region having a predetermined inclined surface (e.g. an inclined surface having an angle of about 59 degrees to 61 degrees). That is, the first plate 74 may include an inclined surface therein, and the conductive liquid 72 and the non-conductive liquid 73 may be disposed in the cavity defined by the inclined surface. The first plate 74 is a housing structure in the liquid lens 700, in which the two liquids 72 and 73 having properties different from each other are accommodated. The third plate 71 and the second plate 77 may include a region through which an optical signal passes, and thus may be formed of a material having high transparency, such as glass. The first plate 74 may also be formed of a material such as glass for convenience of processing (it is easy to prevent the liquids charged in the cavity from flowing out when an intermediate layer formed of the same material is used for bonding). According to another embodiment, the first plate 74 may include impurities so that an optical signal does not easily pass therethrough.

The first electrode 75-1 and the second electrode 75-2 may function to apply driving voltage received from the control circuit (the controller 400A of FIG. 1) for controlling the interface IF formed between the conductive liquid 72 and the non-conductive liquid 73. The first electrode 75-1 may be disposed on the inclined surface of the first plate 74, and the second electrode 75-2 may be disposed on the upper side of the first plate 74.

As described with reference to FIG. 6, electrodes and/or electrode patterns for forming the individual electrodes L1, L2, L3 and L4 and the common electrode C0 may be included in both sides of the first plate 74, which are adjacent to the third plate 71 and the second plate 77. The second electrode 75-2 may be a common electrode, which is disposed so as to be in contact with the conductive liquid 72, and the first electrode 75-1 may be an individual electrode, which is disposed adjacent to the conductive liquid 72, with the insulating layer 76 interposed therebetween.

Here, the first electrode 75-1 and the second electrode 75-2 may include chrome (Cr). Chromium or chrome is a glossy silver rigid transition metal, which is fragile, does not readily discolor, and has a high melting point. However, since an alloy including chromium exhibits high corrosion resistance and rigidity, chromium may be used in the state of being alloyed with other metals. In particular, since chrome (Cr) is not easily corroded or discolored, chrome exhibits high resistance to the conductive liquid in the cavity.

The point at which the interface IF contacts the inclined surface of the cavity may vary according to the difference in the voltage between the individual electrode and the common electrode. Using this, the driving voltages applied to the individual electrodes that are opposite each other may be controlled asymmetrically, thereby changing the FOV in the predetermined change direction of the FOV angle and to the predetermined change angle of the FOV angle.

The insulating layer 76 is a component for physically insulating the first electrode 75-1 from the conductive liquid 72 and the non-conductive liquid 73. For example, the insulating layer 76 may include parylene C, and may be formed through a method such as coating, deposition, or plating.

The insulating layer 76 may be disposed on the inclined surface so as to be in contact with the conductive liquid 72 and the non-conductive liquid 73, and may extend to the upper side of the first plate 74 and to the lower side of the non-conductive liquid 73. Unlike the configuration shown in the drawing, the insulating layer 76 may be disposed on the first electrode 75-1. The insulating layer 76 may be disposed above the first plate 74, on which the first electrode 75-1 and the second electrode 75-2 are disposed adjacent to each other, so as to cover the first electrode 75-1 in order to prevent the first electrode 75-1 from contacting the conductive liquid 72. As shown in FIG. 7, the insulating layer 76 may be disposed such that at least a portion thereof is in contact with the second electrode 75-2. However, the scope of the present disclosure is not limited thereto.

The second plate 77 may be formed of a transparent material such as glass, and may form the cavity together with the third plate 71 and the open region so that the cavity is filled with the conductive liquid 72 and the non-conductive liquid 73.

Hereinafter, a camera module 20 according to another embodiment will be described with reference to the accompanying drawings.

FIG. 8 is a block diagram illustrating a camera module 20 according to another embodiment.

Referring to FIG. 8, the camera module 20 may include a lens assembly 100B, an image sensing unit 200B, an image synthesizer 300, and a controller 400B. Here, since the image synthesizer 300 performs the same function as the image synthesizer 300 shown in FIG. 1, the same reference numeral will be used therefor, and a duplicate description thereof will be omitted.

The lens assembly 100B may be disposed on the image sensing unit 200B, and may allow light incident thereon from the outside of the camera module 20 to pass therethrough so that an optical signal is transmitted to an image sensor 230 included in the image sensing unit 200B. That is, the lens assembly 100B may form an optical path of light incident on the image sensing unit 200B.

The lens assembly 100B may have a configuration shown in FIG. 2a or 2b. In this case, the lens assembly 100B may include the variable lens 110, or may not include the variable lens 110.

In the case in which the lens assembly 100B does not include the variable lens 110, the configuration of the camera module 10A or 10B shown in FIG. 2a or 2b from which the variable lens 110 is excluded may be the configuration of the lens assembly 100B, and thus a duplicate description thereof will be omitted.

The image sensing unit 200B may include an image sensor 230 and an actuator 240. The image sensing unit 200B may adjust the position of the image sensor 230 relative to the lens assembly 100B under the control of the controller 400B. To this end, the actuator 240 may adjust the physical displacement of the image sensor 230.

In the case of the camera module 10 according to the embodiment shown in FIG. 1, the optical path of light incident on the image sensor 200A from the outside is adjusted by the variable lens 110.

In the case of the camera module 20 according to another embodiment shown in FIG. 8, it is possible to obtain an effect of adjusting the optical path of light incident on the image sensor 230 by adjusting the position of the image sensor 230 relative to the lens assembly (i.e. the lens).

Like the lens assembly 100A shown in FIG. 1, in the case in which the lens assembly 100B shown in FIG. 8 includes the variable lens 110, the optical path of light incident on the image sensor 230 from the outside of the camera module 20 may be primarily adjusted by the variable lens 110, and may be secondarily adjusted by the actuator 240.

In addition, in the case in which the lens assembly 100B includes the variable lens 110, the controller 400B may control the lens assembly 100B and the image sensor 230, like the controller 400A. In this case, a third signal shown in FIG. 8 may include a first signal, and a fourth signal may include a second signal. However, in the case in which the lens assembly 100B does not include the variable lens 110, the third signal may be omitted.

As described above, the controller 400B may adjust the position of the image sensor 230 relative to the lens assembly 100B by controlling the actuator 240 of the image sensing unit 200B. To this end, the controller 400B may transmit and receive the fourth signal to and from the image sensing unit 200B. That is, the actuator 240 may move or tilt the image sensor 230 in at least one of the optical-axis direction (or the direction parallel to the optical axis) (e.g. the z-axis direction) or the horizontal direction perpendicular to the optical-axis direction in response to the fourth signal. To this end, the actuator 240 may be a piezoelectric element, a voice coil motor (VCM), or a MEMS, but the disclosure is not limited as to the specific form of the actuator 240.

In addition, the actuator 240 may move the image sensor 230, may move the substrate 250 on which the image sensor 230 is disposed as shown in FIG. 2a or 2b, may move the package of the image sensor 230, or may move the pixel array of the image sensor 230, in at least one of the optical-axis direction (or the direction parallel to the optical axis) (e.g. the z-axis direction) or the horizontal direction perpendicular to the optical-axis direction, but the disclosure is not limited thereto.

Hereinafter, various embodiments 200B1 to 200B4 of the image sensing unit 200B shown in FIG. 8 will be described with reference to the accompanying drawings, but the disclosure is not limited thereto. For example, the camera module 20 according to the embodiment may be configured such that a substrate 250A and 250B and an image sensing unit 200B1 to 200B4 shown in FIGS. 9 to 12b are included instead of the substrate 250 and the image sensor 200A of the camera module 10A or 10B shown in FIG. 2a or FIG. 2b and such that the variable lens 110 shown in FIGS. 2a and 2b is omitted.

FIG. 9 is a cross-sectional view of an embodiment 200B1 of the image sensing unit 200B shown in FIG. 8.

Referring to FIG. 9, the image sensing unit 200B1 may include an actuator 240A, a substrate 250A, and an image sensor 230A. Here, the image sensor 230A and the actuator 240A correspond to embodiments of the image sensor 230 and the actuator 240 shown in FIG. 8, respectively.

The substrate 250A may be disposed on the actuator 240A, and the image sensor 230A may be disposed on the substrate 250A. That is, as shown in FIG. 9, the actuator 240A may be disposed under the substrate 250 shown in FIG. 2a or FIG. 2b. In this configuration, the controller 400B may move or tilt the actuator 240A in at least one of the optical-axis direction (or the direction parallel to the optical axis) (e.g. the z-axis direction) or the horizontal direction perpendicular to the optical-axis direction. The substrate 250A and the image sensor 230A may move together in the same direction as the direction in which the actuator 240A moves. For example, when the actuator 240A moves in the directions indicated by the arrows AR1 and AR2, the substrate 250A and the image sensor 230A may move together in the same direction thereas.

FIG. 10 is a plan view of another embodiment 200B2 of the image sensing unit 200B shown in FIG. 8.

Referring to FIG. 10, the image sensing unit 200B2 may include an actuator 240B, a substrate 250B, elastic members 262 to 268, and an image sensor 230B. Here, the image sensor 230B and the actuator 240B correspond to other embodiments of the image sensor 230 and the actuator 240 shown in FIG. 8, respectively.

The substrate 250B and the image sensor 230B play the same role as the substrate 250 and the image sensor 200A shown in FIG. 2a or FIG. 2b, respectively. The substrate 250B has an annular planar shape surrounding the image sensor 230B. The image sensor 230B may be disposed inside the annular-shaped substrate 250B, and may be spaced apart from the inner circumferential surface of the substrate 250B by a predetermined distance.

The elastic members 262 to 268 may be respectively disposed between the outer corners of the image sensor 230B and the inner corners of the substrate 250B, and may restore the position of the image sensor 230B, which has been physically displaced by the actuator 240B. The actuator 240B may be disposed between the image sensor 230B and the substrate 250B, and may be a MEMS.

When the actuator 240B moves or tilts in one of the horizontal direction and the vertical direction, the image sensor 230B may also move in the same direction as the direction in which the actuator 240B moves.

FIG. 11 is a plan view of still another embodiment 200B3 of the image sensing unit 200B shown in FIG. 8.

Referring to FIG. 11, the image sensing unit 200B3 may include actuators AR1 to AR4 (242 to 248) and an image sensor 230C. Here, the image sensor 230C and the actuators 242 to 248 correspond to still other embodiments of the image sensor 230 and the actuator 240 shown in FIG. 8, respectively.

The actuators AC1, AC2, AC3 and AC4 (242 to 248) may be disposed so as to face the four sides of the image sensor 230C, and may apply pressure to the image sensor 230C in the directions indicated by the arrows AR3 to AR6 to move the image sensor 230C in the horizontal direction. That is, the actuator AC1 (242) may apply pressure to a first side of the four sides of the image sensor 230C in the direction indicated by the arrow AR3 to move the image sensor 230C in the +x-axis direction. The actuator AC2 (244) may apply pressure to a second side of the four sides of the image sensor 230C in the direction indicated by the arrow AR4 to move the image sensor 230C in the −x-axis direction. The actuator AC3 (246) may apply pressure to a third side of the four sides of the image sensor 230C in the direction indicated by the arrow AR5 to move the image sensor 230C in the +y-axis direction. The actuator AC4 (248) may apply pressure to a fourth side of the four sides of the image sensor 230C in the direction indicated by the arrow AR6 to move the image sensor 230C in the −y-axis direction.

In the case of FIG. 11, since the image sensor 230C has a rectangular planar shape, the image sensing unit 200B3 includes four actuators AC1, AC2, AC3 and AC4 (242 to 248), but the disclosure is not limited thereto. That is, depending on the planar shape of the image sensor 230C, the number of actuators 242 to 248 may be greater than or less than four.

In addition, although not shown in FIG. 11, additional actuators may be disposed on and under the image sensor 230C, and may apply pressure to the upper portion and the lower portion of the image sensor 230C to move the image sensor 230C in the vertical direction.

As described above, the actuators for applying pressure to the image sensor 230C may be implemented as piezoelectric elements, and the controller 400B may generate a fourth signal for driving a corresponding piezoelectric element among the plurality of piezoelectric elements.

FIGS. 12a and 12b are perspective views of still another embodiment 200B4 of the image sensing unit 200B shown in FIG. 8.

Referring to FIG. 12b, the image sensing unit 200B4 may include an image sensor 230D and an actuator 240C. Here, the image sensor 230D and the actuator 240C correspond to still another embodiments of the image sensor 230 and the actuator 240 shown in FIG. 8, respectively.

The image sensor 230D may be disposed on the MEMS-type actuator 240C shown in FIG. 12a.

When the actuator 240C moves or tilts in at least one of the horizontal direction or the vertical direction under the control of the controller 400B, the image sensor 230D may also move in the same direction as the direction in which the actuator 240C moves.

The distance that the image sensors 230A, 230B, 230C and 230D are moved by the above-described actuators 240A, 240B, 242 to 248, and 240C may be 1 mm or less, and the tilting angle thereof may be 1° or less.

Meanwhile, the image synthesizer 300 shown in FIG. 8 may be an image processor that receives an image signal from the image sensor 230 and processes the image signal (e.g. interpolation, frame synthesis, etc.). In particular, the image synthesizer 300 may generate an image signal of one frame (high resolution) by synthesizing image signals of a plurality of frames (low resolution). The plurality of image frames may be respective image frames generated by the change in the position of the image sensor 230 relative to the lens assembly 100B. The image synthesizer 300 may be referred to as a postprocessor. The plurality of image frames may include a first image frame and a second image frame, and the second image frame may be an image frame moved by a first interval based on the first image frame.

Hereinafter, an operation method of the embodiments of the camera modules 10 and 20 described above will be described with reference to the accompanying drawings.

FIG. 13 is a diagram for explaining an operation method of the camera modules 10 and 20 according to an embodiment. FIG. 14 is a diagram for explaining the operation method of the camera modules 10 and 20 explained in FIG. 13 in more detail.

FIG. 13 illustrates a mimetic diagram of a method of obtaining a super-resolution image by changing the optical path of light incident on the image sensor 200A or changing the position of the image sensor 230 relative to the lens assembly.

The pixel array of the image sensor 200A or 230 may include a plurality of pixels arranged in the form of an N×M matrix. For convenience of description, the following description will be made on the assumption that the pixel array includes a plurality of pixels (A1 to A4) arranged in the form of a 2×2 matrix, as shown in FIG. 13.

Each of the pixels A1 to A4 may generate image information (i.e. an analog pixel signal corresponding to the optical signal) about each of pixel scenes PS1 to PS4 using the optical signal transmitted through the lens assembly 100A or 100B.

When the distance between pixels adjacent to each other in the x-axis direction (or the y-axis direction) (e.g. the distance between the centers of the pixels) is 1 pixel distance (PD), a half thereof corresponds to 0.5 PD. Hereinafter, first to fourth pixel shifts A to D will be defined.

The first pixel shift A is to shift the respective pixels A1 to A4 by 0.5 PD rightwards in the +x-axis direction, and B1 to B4 denote the pixels after completion of the first pixel shift A.

The second pixel shift B is to shift the respective pixels B1 to B4 by 0.5 PD downwards in the +y-axis direction, and C1 to C4 denote the pixels after completion of the second pixel shift B.

The third pixel shift C is to shift the respective pixels C1 to C4 by 0.5 PD leftwards in the −x-axis direction, and D1 to D4 denote the pixels after completion of the third pixel shift C.

The fourth pixel shift D is to shift the respective pixels D1 to D4 by 0.5 PD upwards in the −y-axis direction, and A1 to A4 denote the pixels after completion of the fourth pixel shift D.

Here, the pixel shift is not to shift the physical position of the pixels of the pixel array, but is to adjust the path of passed-through light or the position of the image sensor 230 relative to the lens assembly by controlling at least one of the variable lens 110 or the actuator 240 such that a virtual pixel (e.g. B1) between two pixels (e.g. A1 and A2) may acquire a pixel scene.

Referring to FIG. 14, the respective pixels A1 to A4 may acquire a pixel scene S1, and the image sensor 200A or 230 may generate a first frame F1 from pixel signals of the respective pixels A1 to A4.

In response to the lens control signal for changing the optical path or the FOV of the lens assembly 100A rightwards by the first angle variation θx in order to realize the first pixel shift A, the variable lens 110 may change the optical path or the FOV of the lens assembly 100A rightwards by the first angle variation θx, whereby the first pixel shift A may be performed. Alternatively, in response to the fourth signal for moving the position of the image sensor 230 relative to the lens assembly 100B rightwards by the first angle variation θx in order to realize the first pixel shift A, the actuator 240 may change the relative position of the image sensor 230 rightwards by the first angle variation θx, whereby the first pixel shift A may be performed. Thereafter, the respective pixels B1 to B4 may acquire a pixel scene S2, and the image sensor 200A or 230 may generate a second frame F2 from pixel signals of the respective pixels B1 to B4.

In response to the lens control signal for changing the optical path or the FOV of the lens assembly 100A downwards by the second angle variation θy in order to realize the second pixel shift B, the variable lens 110 may change the optical path or the FOV of the lens assembly 100A downwards by the second angle variation θy, whereby the second pixel shift B may be performed. Alternatively, in response to the fourth signal for changing the position of the image sensor 230 relative to the lens assembly 100B downwards by the second angle variation θy in order to realize the second pixel shift B, the actuator 240 may change the relative position of the image sensor 230 downwards by the second angle variation θy, whereby the second pixel shift B may be performed. Thereafter, the respective pixels C1 to C4 may acquire a pixel scene S3, and the image sensor 200A or 230 may generate a third frame F3 from pixel signals of the respective pixels C1 to C4.

In response to the lens control signal for changing the optical path or the FOV of the lens assembly 100A leftwards by the first angle variation θx in order to realize the third pixel shift C, the variable lens 110 may change the optical path or the FOV of the lens assembly 100A leftwards by the first angle variation θx, whereby the third pixel shift C may be performed. Alternatively, in response to the fourth signal for changing the position of the image sensor 230 relative to the lens assembly 100B leftwards by the first angle variation θx in order to realize the third pixel shift C, the actuator 240 may change the relative position of the image sensor 230 leftwards by the first angle variation θx, whereby the third pixel shift C may be performed. Thereafter, the respective pixels D1 to D4 may acquire a pixel scene S4, and the image sensor 200A or 230 may generate a fourth frame F4 from pixel signals of the respective pixels D1 to D4.

In response to the lens control signal for changing the optical path or the FOV of the lens assembly 100A upwards by the second angle variation θy in order to realize the fourth pixel shift D, the variable lens 110 may change the optical path or the FOV of the lens assembly 100A upwards by the second angle variation θy, whereby the fourth pixel shift D may be performed. Alternatively, in response to the fourth signal for changing the position of the image sensor 230 relative to the lens assembly 100B upwards by the second angle variation θy in order to realize the fourth pixel shift D, the actuator 240 may change the relative position of the image sensor 230 upwards by the second angle variation θy, whereby the fourth pixel shift D may be performed. Thereafter, the respective pixels A1 to A4 may acquire a pixel scene S1, and the image sensor 200A or 230 may generate a fifth frame F5 from pixel signals of the respective pixels A1 to A4. Subsequently, the pixel shift and the generation of the frame through the shifted pixels may be repeatedly performed.

Here, each of the first angle variation θx and the second angle variation θy may store information related to the extent to which the optical path is changed or the extent to which the relative position of the image sensor 230 is changed so that the pixels are shifted by 0.5 PD, and may be calculated in advance based on the first FOV angle Fx and the second FOV angle Fy and may be stored (e.g. by the image sensor 200A or 230, the image synthesizer 300 or the controller 400A or 400B).

The image sensor 200A may include a first region and a second region, and the controller 400A may output a first signal to control the variable lens 110 such that the optical path of light, which is incident from the outside and passes through the variable lens 110, is changed from the first region to the second region of the image sensor 200A. Alternatively, the image sensor 230 may include a first region and a second region, and the controller 400B may output a fourth signal to control the actuator 240 such that the region that receives light, which is incident from the outside and passes through the lens assembly 100B, is changed from the first region to the second region of the image sensor 230.

In addition, the image sensor 200A may further include a third region and a fourth region, and the controller 400A may output a first signal to control the variable lens 110 such that the optical path is changed from the second region to the third region of the image sensor 200A, and may output a first signal to control the variable lens 110 such that the optical path is changed from the third region to the fourth region. Alternatively, the image sensor 230 may further include a third region and a fourth region, and the controller 400B may output a fourth signal to control the actuator 240 such that the region that receives light, which is incident from the outside and passes through the lens assembly 100B, is changed from the second region to the third region of the image sensor 230, and may output a fourth signal to control the actuator 240 such that the light-receiving region is changed from the third region to the fourth region.

The first signal may include a signal for changing the FOV of the lens assembly 100A in a first direction, a signal for changing the FOV of the lens assembly 100A in a second direction, a signal for changing the FOV of the lens assembly 100A in a third direction, and a signal for changing the FOV of the lens assembly 100A in a fourth direction. Alternatively, the fourth signal may include a signal for changing the FOV of the image sensor 230 in the first direction, a signal for changing the FOV of the image sensor 230 in the second direction, a signal for changing the FOV of the image sensor 230 in the third direction, and a signal for changing the FOV of the image sensor 230 in the fourth direction.

The image synthesizer 300 may be an image processor that receives an image signal from the image sensor 200A and processes the image signal (e.g. interpolation, frame synthesis, etc.). In particular, the image synthesizer 300 may generate an image signal of one frame (high resolution) by synthesizing image signals of a plurality of frames (low resolution). The plurality of image frames may be respective image frames generated along respectively different optical paths changed by the variable lens 110. The image synthesizer 300 may be referred to as a postprocessor. The plurality of image frames may include a first image frame and a second image frame, and the second image frame may be an image frame moved by a first interval based on the first image frame.

The image synthesizer 300 may synthesize the first to fourth frames and may generate an image acquired by a 2N×2M pixel array rather than by an N×M pixel array. As a method in which the image synthesizer 300 synthesizes the first to fourth frames, a method of simply merging the first to fourth frames according to the positions of the respective pixels (e.g. in the case of the first row, generating one frame by arranging the pixel signal of A1, the pixel signal of B1, the pixel signal of A2, and the pixel signal of B2) or a method of correcting the pixel signal of any one pixel (e.g. C1) using the pixel signals of the pixels adjacent thereto (e.g. A1, B1, A2, D1, D2, A3, B3, and A4) based on the principle in which the pixel scenes of adjacent pixels overlap each other may be used. However, the scope of the disclosure is not limited thereto. Any of various methods of generating a super-resolution image may be used. The image synthesizer 300 may be referred to as a postprocessor. The postprocessor may generate a first super-resolution image frame by synthesizing the first to fourth image frames transmitted from the image sensor 200A or 230, and may then generate a second super-resolution image frame by synthesizing the fifth image frame and the second to fourth image frames output from the image sensor 200A or 230.

According to the operation method of the camera module 10 or 20 shown in FIGS. 13 and 14, an image having a quadruple resolution may be generated by synthesizing a plurality of frames acquired through pixel shift.

FIG. 15 is a timing diagram of the operation method of the camera module 10 or 20 according to an embodiment.

Referring to FIG. 15, in response to the lens control signal for changing the optical path or the FOV of the lens assembly 100A upwards by the second angle variation θy, the variable lens 110 may perform the fourth pixel shift D to change the optical path or the FOV of the lens assembly 100A upwards by the second angle variation θy. In some embodiments, the controller 400A may transmit a feedback signal, which indicates that the fourth pixel shift D has been completed by the variable lens 110 in response to the first signal, to the image sensor 200A. In this case, the controller 400A may determine the completion of the fourth pixel shift D through a response signal from the variable lens 110 or a separate timer. The respective pixels A1 to A4 of the image sensor 200A that receives the feedback signal may acquire the pixel scene S1, and the image sensor 200A may generate the first frame F1 from the pixel signals of the respective pixels A1 to A4.

Alternatively, in response to the fourth signal for changing the image sensor 230 upwards by the second angle variation θy, the actuator 240 may perform the fourth pixel shift D to change the image sensor 230 upwards by the second angle variation θy. In some embodiments, the controller 400B may transmit a feedback signal, which indicates that the fourth pixel shift D has been completed by the actuator 240 in response to the fourth signal, to the image sensor 230. In this case, the controller 400B may determine completion of the fourth pixel shift D through a response signal from the actuator 240 or a separate timer. The respective pixels A1 to A4 of the image sensor 230 that receives the feedback signal may acquire the pixel scene S1, and the image sensor 230 may generate the first frame F1 from the pixel signals of the respective pixels A1 to A4.

In response to the first signal for changing the optical path or the FOV of the lens assembly 100A rightwards by the first angle variation θx, the variable lens 110 may perform the first pixel shift A to change the optical path or the FOV of the lens assembly 100A rightwards by the first angle variation θx. In some embodiments, the controller 400A may transmit a feedback signal, which indicates that the first pixel shift A has been completed by the variable lens 110 in response to the first signal, to the image sensor 200A. In this case, the controller 400A may determine completion of the first pixel shift A through a response signal from the variable lens 110 or a separate timer. The respective pixels B1 to B4 of the image sensor 200A that receives the feedback signal may acquire the pixel scene S2, and the image sensor 200A may generate the second frame F2 from the pixel signals of the respective pixels B1 to B4.

Alternatively, in response to the fourth signal for changing the image sensor 230 rightwards by the first angle variation θx, the actuator 240 may perform the first pixel shift A to change the image sensor 230 rightwards by the first angle variation θx. In some embodiments, the controller 400B may transmit a feedback signal, which indicates that the first pixel shift A has been completed by the actuator 240 in response to the fourth signal, to the image sensor 230. In this case, the controller 400B may determine completion of the first pixel shift A through a response signal from the actuator 240 or a separate timer. The respective pixels B1 to B4 of the image sensor 230 that receives the feedback signal may acquire the pixel scene S2, and the image sensor 230 may generate the second frame F2 from the pixel signals of the respective pixels B1 to B4.

In response to the lens control signal for changing the optical path or the FOV of the lens assembly 100A downwards by the second angle variation θy, the variable lens 110 may perform the second pixel shift B to change the optical path or the FOV of the lens assembly 100A downwards by the second angle variation θy. In some embodiments, the controller 400A may transmit a feedback signal, which indicates that the second pixel shift B has been completed by the variable lens 110 in response to the lens control signal, to the image sensor 200A. In this case, the controller 400A may determine completion of the second pixel shift B through a response signal from the variable lens 110 or a separate timer. The respective pixels C1 to C4 of the image sensor 200A that receives the feedback signal may acquire the pixel scene S3, and the image sensor 200A may generate the third frame F3 from the pixel signals of the respective pixels C1 to C4.

Alternatively, in response to the fourth signal for changing the image sensor 230 downwards by the second angle variation θy, the actuator 240 may perform the second pixel shift B to change the image sensor 230 downwards by the second angle variation θy. In some embodiments, the controller 400B may transmit a feedback signal, which indicates that the second pixel shift B has been completed by the actuator 240 in response to the fourth signal, to the image sensor 230. In this case, the controller 400B may determine completion of the second pixel shift B through a response signal from the actuator 240 or a separate timer. The respective pixels C1 to C4 of the image sensor 230 that receives the feedback signal may acquire the pixel scene S3, and the image sensor 230 may generate the third frame F3 from the pixel signals of the respective pixels C1 to C4.

In response to the lens control signal for changing the optical path or the FOV of the lens assembly 100A leftwards by the first angle variation θx, the variable lens 110 may perform the third pixel shift C to change the optical path or the FOV of the lens assembly 100A leftwards by the first angle variation θx. In some embodiments, the controller 400A may transmit a feedback signal, which indicates that the third pixel shift C has been completed by the variable lens 110 in response to the lens control signal, to the image sensor 200A. In this case, the controller 400A may determine completion of the third pixel shift C through a response signal from the variable lens 110 or a separate timer. The respective pixels D1 to D4 of the image sensor 200A that receives the feedback signal may acquire the pixel scene S4, and the image sensor 200A may generate the fourth frame F4 from the pixel signals of the respective pixels D1 to D4.

Alternatively, in response to the fourth signal for changing the image sensor 230 leftwards by the first angle variation θx, the actuator 240 may perform the third pixel shift C to change the image sensor 230 leftwards by the first angle variation θx. In some embodiments, the controller 400B may transmit a feedback signal, which indicates that the third pixel shift C has been completed by the actuator 240 in response to the fourth signal, to the image sensor 230. In this case, the controller 400B may determine completion of the third pixel shift C through a response signal from the actuator 240 or a separate timer. The respective pixels D1 to D4 of the image sensor 230 that receives the feedback signal may acquire the pixel scene S4, and the image sensor 230 may generate the fourth frame F4 from the pixel signals of the respective pixels D1 to D4.

Thereafter, in response to the lens control signal for changing the optical path or the FOV of the lens assembly 100A upwards by the second angle variation θy, the variable lens 110 may perform the fourth pixel shift D to change the optical path or the FOV of the lens assembly 100A upwards by the second angle variation θy. In some embodiments, the controller 400A may transmit a feedback signal, which indicates that the fourth pixel shift D has been completed by the variable lens 110 in response to the lens control signal, to the image sensor 200A. In this case, the controller 400A may determine completion of the fourth pixel shift D through a response signal from the variable lens 110 or a separate timer. The respective pixels A1 to A4 of the image sensor 200A that receives the feedback signal may acquire the pixel scene S1, and the image sensor 200A may generate the fifth frame F5 from the pixel signals of the respective pixels A1 to A4. Subsequently, the pixel shift and the generation of the frame through the shifted pixels may be repeatedly performed.

Alternatively, in response to the fourth signal for changing the image sensor 230 upwards by the second angle variation θy, the actuator 240 may perform the fourth pixel shift D to change the image sensor 230 upwards by the second angle variation θy. In some embodiments, the controller 400B may transmit a feedback signal, which indicates that the fourth pixel shift D has been completed by the actuator 240 in response to the fourth signal, to the image sensor 230. In this case, the controller 400B may determine completion of the fourth pixel shift D through a response signal from the actuator 240 or a separate timer. The respective pixels A1 to A4 of the image sensor 230 that receives the feedback signal may acquire the pixel scene S1, and the image sensor 230 may generate the fifth frame F5 from the pixel signals of the respective pixels A1 to A4. Subsequently, the pixel shift and the generation of the frame through the shifted pixels may be repeatedly performed.

In particular, referring to FIG. 15, the controller 400A may transmit the lens control signal when generation of the image frame by the image sensor 200A is completed and the image sensor 200A transmits a synchronization signal, which instructs transmission of the lens control signal to the variable lens 110, thereto. That is, a series of operations including the pixel shift, the generation of the frame, and the subsequent pixel shift may be performed through transmission and reception of the first signal and the second signal and synchronization thereof.

FIG. 16 is a diagram illustrating an example of a frame synthesis method of the camera module 10 or 20 according to an embodiment.

Referring to FIG. 16, it is assumed that the image sensor 200A or 230 sequentially generates the first to seventh frames F1 to F7 according to the sequential pixel shifts A to D.

The image synthesizer 300 may sequentially receive the frames, and may generate a composite frame, which is a super-resolution image, through synthesis of the super-resolution (SR) image.

In this case, as shown in FIG. 16, the image synthesizer 300 may receive the first to fourth frames F1 to F4, and may generate a first composite frame F1'. Thereafter, the image synthesizer 300 may receive the second to fifth frames F2 to F5, and may generate a second composite frame F2'. Thereafter, the image synthesizer 300 may receive the third to sixth frames F3 to F6, and may generate a third composite frame F3'. Thereafter, the image synthesizer 300 may receive the fourth to seventh frames F4 to F7, and may generate a fourth composite frame F4' through a super-resolution image generation algorithm.

Here, the image synthesizer 300 may sequentially receive the first to seventh frames F1 to F7 from the image sensor 200A or 230, and may store three frames preceding the frame that is currently input thereto in order to generate a composite frame. In some embodiments, a buffer for storing the frames may have a storage capacity capable of storing at least three frames.

If a composite frame is generated using the first to fourth frames and thereafter a composite frame is generated using the fifth to eighth frames, the frame rate may be reduced to ¼ of the original frame rate. However, according to the method of the embodiment, composite frames are successively generated using the current frame and three frames preceding the current frame that are sequentially input, thereby preventing deterioration in frame rate.

In the present specification, the method of generating a super-resolution image having a quadruple resolution through four pixel shifts has been described, but the scope of the disclosure is not limited thereto. A super-resolution image having a higher resolution may be generated through any of other pixel shift methods.

A camera module according to still another embodiment may include a lens assembly including a liquid lens for adjusting an optical path, an image sensor for sensing a plurality of images using the lens assembly, a controller for controlling the liquid lens, and a synthesizer for synthesizing the plurality of images to generate a composite image. The plurality of images may include images generated along respectively different optical paths changed by the liquid lens.

A camera module according to still another embodiment may include an image sensor for sensing a plurality of images, a lens assembly for forming an optical path of light incident on the image sensor, a controller for adjusting at least one of the optical path or the position of the image sensor, and an image synthesizer for synthesizing the plurality of images to generate a composite image. The plurality of images may include images generated along respectively different optical paths by the lens assembly or images generated at respectively different positions of the image sensor.

Hereinafter, a super-resolution image generation method performed by the above-described camera module 10 or 20 will be described.

The super-resolution image generation method may include a step of outputting a first image frame, a step of generating a second image frame, which is moved by a first distance in a first direction from the first image frame, a step of generating a third image frame, which is moved by the first distance in a second direction from the second image frame, a step of generating a fourth image frame, which is moved by the first distance in a third direction from the third image frame, and a step of synthesizing the first image frame to the fourth image frame to generate a composite image. The composite image generated through this method may have a higher resolution than a plurality of image frames.

According to the camera modules 10 and 20 according to the embodiments, high computational complexity required to obtain a super-resolution image may be solved by a hardware-based method using the variable lens 110 or the actuator 240 for changing the FOV angle.

In addition, composite frames may be successively generated with respect to the current frames that are sequentially input, thereby preventing deterioration in frame rate.

The above-described camera module 10 may include a lens assembly, which includes a liquid lens mounted in a housing and at least one solid lens that may be disposed on the front surface or the rear surface of the liquid lens, an image sensor for converting an optical signal transmitted through the lens assembly into an electrical signal, and a control circuit for supplying a driving voltage to the liquid lens. In this case, the lens assembly of the above-described camera module 20 may not include a liquid lens, but may include only a solid lens.

The above description may also be applied to a distance or depth measurement device using time of flight (ToF). In particular, the resolution of a ToF sensor is generally lower than that of a commonly used image sensor. Therefore, if the super-resolution image generation method described above is used to implement facial recognition, object recognition, depth extraction, contour recognition, or the like using a ToF sensor, significantly improved effects may be obtained.

Although only a limited number of embodiments have been described above, various other embodiments are possible. The technical contents of the above-described embodiments may be combined into various forms as long as they are not incompatible with one another, and thus may be implemented in new embodiments.

For example, an optical device (or an optical instrument) including the above-described camera module 10 or 20, which includes at least one of a liquid lens or a solid lens, may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include at least one of a solid lens or a liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

MODE FOR INVENTION

Various embodiments have been described in the best mode for carrying out the disclosure.

INDUSTRIAL APPLICABILITY

A camera module according to embodiments may be used in camera/video devices, telescopic devices, microscopic devices, an interferometer, a photometer, a polarimeter, a spectrometer, a reflectometer, an auto-collimator, a lensmeter, etc.

The invention claimed is:

1. A camera module, comprising:
an image sensor configured to output a plurality of image frames;
a lens assembly disposed on the image sensor, the lens assembly forming an optical path of light incident on the image sensor from outside;
a controller electrically connected to the lens assembly, and controlled to generate a control signal to adjust at least one of the optical path of the lens assembly or the position of the image sensor relative to the lens assembly; and
an image synthesizer electrically connected to the image sensor to synthesize the plurality of image frames to generate a composite image,
wherein the composite image has a higher resolution than the plurality of image frames,
wherein the plurality of image frames are respective image frames generated along respectively different optical paths changed by shifting of the different optical paths by the lens assembly along the image sensor or respective image frames generated by change in the position of the image sensor relative to the lens assembly,
wherein the lens assembly comprises a variable lens disposed on the image sensor and configured to adjust the optical path of light incident on the image sensor from outside,
wherein the image sensor comprises a first region and a second region, and
wherein the controller controls the variable lens such that an optical path of light, incident from outside and passing through the variable lens, is changed from the first region to the second region of the image sensor,
wherein the image sensor further includes a third region and a fourth region, and
wherein the controller controls the variable lens such that the optical path is changed from the second region to the third region, and outputs a signal to control the variable lens such that the optical path is changed from the third region to the fourth region.

2. The camera module according to claim 1, wherein, after the image sensor generates one image frame among the plurality of image frames, the image sensor receives a feedback signal indicating that the optical path has been adjusted by the variable lens, and then generates another image frame among the plurality of image frames.

3. The camera module according to claim 1, wherein the lens assembly comprises:
a first lens unit;
a second lens unit;
a lens barrel accommodating the first lens unit and the second lens unit; and
a holder coupled to the lens barrel to support the lens barrel.

4. The camera module according to claim 3, wherein the variable lens is disposed outside of the lens barrel, above the first lens unit within the lens barrel, between the first lens unit and the second lens unit, or below the second lens unit within the lens barrel.

5. The camera module according to claim 3, comprising a cover exposing an opening in an upper portion of the lens assembly.

6. The camera module according to claim 1, wherein the different optical paths are changed using the variable lens.

7. The camera module according to claim 1, wherein the variable lens comprises a liquid lens configured such that an interface formed between two liquids having properties different from each other is deformed according to the control signal.

8. The camera module according to claim 1, wherein the variable lens comprises:
at least one lens; and
an actuator configured to move or tilt the at least one lens in at least one of a vertical direction or a horizontal direction according to the control signal.

9. The camera module according to claim 1, comprising:
an actuator, the controller moving or tilting the actuator in at least one of optical-axis direction, a direction parallel to an optical axis, or a direction perpendicular to the optical-axis direction; and
a substrate disposed on the actuator,
wherein the image sensor is disposed on the substrate and is capable of moving together with the substrate in the same direction as a direction in which the actuator moves.

10. The camera module according to claim 1, comprising:
a substrate having an annular planar shape surrounding the image sensor;
an actuator disposed between the image sensor and the substrate; and
a plurality of elastic members disposed between outer corners of the image sensor and inner corners of the substrate,
wherein the image sensor is capable of moving in the same direction as a direction in which the actuator moves, and
wherein the image sensor is spaced apart from an inner circumferential surface of the substrate by a predetermined distance.

11. The camera module according to claim 1, wherein the image synthesizer generates a first super-resolution image frame by synthesizing first to fourth image frames transmitted from the image sensor, and thereafter generates a second super-resolution image frame by synthesizing a fifth image frame and the second to fourth image frames output from the image sensor.

12. The camera module according to claim 1, wherein the plurality of image frames includes a first image frame and a second image frame, and
wherein the second image frame is an image frame moved by a first interval based on the first image frame.

13. The camera module according to claim 1, wherein the controller receives a signal indicating that one of the plurality of image frames has been completely generated, and then transmits the control signal to the variable lens to adjust the optical path.

14. The camera module according to claim 1, wherein the control signal includes a signal for changing a field of view (FOV) of the lens assembly in a first direction, a signal for changing the FOV of the lens assembly in a second direction, a signal for changing the FOV of the lens assembly in a third direction, and a signal for changing the FOV of the lens assembly in a fourth direction.

15. The camera module according to claim 1, wherein the variable lens is a variable prism configured such that an angle of a lower plate thereof is changed according to the control signal.

16. A camera module, comprising:
a lens assembly comprising a liquid lens configured to adjust an optical path;
an image sensor configured to sense a plurality of images using the lens assembly;
a controller electrically connected to the lens assembly, and controls the liquid lens; and
a synthesizer electrically connected to the image sensor to synthesize the plurality of images to generate a composite image,
wherein the plurality of images comprise images generated along respectively different optical paths changed by shifting of the different optical paths by the liquid lens along the image sensor,
wherein the lens assembly comprises a variable lens disposed on the image sensor and configured to adjust the optical path of light incident on the image sensor from outside,
wherein the image sensor comprises a first region and a second region, and
wherein the controller controls the variable lens such that an optical path of light, incident from outside and passing through the variable lens, is changed from the first region to the second region of the image sensor,
wherein the image sensor further includes a third region and a fourth region, and
wherein the controller controls the variable lens such that the optical path is changed from the second region to the third region, and outputs a signal to control the variable lens such that the optical path is changed from the third region to the fourth region.

17. A camera module, comprising:
an image sensor configured to sense a plurality of images;
a lens assembly configured to form an optical path of light incident on the image sensor;
a controller electrically connected to the lens assembly, and controlled to adjust at least one of the optical path or a position of the image sensor; and
an image synthesizer electrically connected to the image sensor to synthesize the plurality of images to generate a composite image,
wherein the plurality of images comprise images generated along respectively different optical paths by shifting of the different optical paths by the lens assembly along the image sensor or images generated at respectively different positions of the image sensor,
wherein the lens assembly comprises a variable lens disposed on the image sensor and configured to adjust the optical path of light incident on the image sensor from outside,
wherein the image sensor comprises a first region and a second region, and
wherein the controller controls the variable lens such that an optical path of light, incident from outside and passing through the variable lens, is changed from the first region to the second region of the image sensor,
wherein the image sensor further includes a third region and a fourth region, and
wherein the controller controls the variable lens such that the optical path is changed from the second region to the third region, and outputs a signal to control the variable lens such that the optical path is changed from the third region to the fourth region.

* * * * *